(12) United States Patent
Gopal et al.

(10) Patent No.: US 12,160,326 B2
(45) Date of Patent: Dec. 3, 2024

(54) DYNAMIC CONTROLLER AREA NETWORK MESSAGING

(71) Applicant: FORD GLOBAL TECHNOLOGIES, LLC, Dearborn, MI (US)

(72) Inventors: Amrit Gopal, Ypsilanti, MI (US); James Martin Lawlis, Grosse Pointe Farms, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 645 days.

(21) Appl. No.: 17/496,042

(22) Filed: Oct. 7, 2021

(65) Prior Publication Data

US 2023/0116328 A1 Apr. 13, 2023

(51) Int. Cl.
*H04L 12/40* (2006.01)
*H04L 12/46* (2006.01)

(52) U.S. Cl.
CPC .... *H04L 12/40169* (2013.01); *H04L 12/4625* (2013.01); *H04L 2012/40215* (2013.01); *H04L 2012/40273* (2013.01)

(58) Field of Classification Search
CPC ........... H04L 12/40169; H04L 12/4625; H04L 2012/40273; H04L 2012/40215
See application file for complete search history.

(56) References Cited

U.S. PATENT DOCUMENTS

| | | | |
|---|---|---|---|
| 6,477,580 B1 | 11/2002 | Bowman-Amuah | |
| 7,933,998 B2 | 4/2011 | Anderson et al. | |
| 8,874,813 B2 * | 10/2014 | Horihata | H04L 12/4625 710/60 |
| 10,140,783 B2 | 11/2018 | Thornburg et al. | |
| 10,916,073 B2 * | 2/2021 | Tonshal | G07C 5/0808 |
| 11,048,828 B2 * | 6/2021 | Bitton | G06F 21/64 |
| 2016/0082903 A1 * | 3/2016 | Haggerty | B60R 16/023 701/23 |
| 2016/0308891 A1 * | 10/2016 | Cain | H04L 12/4625 |
| 2018/0212797 A1 | 7/2018 | Haenger et al. | |
| 2018/0234498 A1 * | 8/2018 | Sangameswaran | H04L 12/18 |
| 2019/0126859 A1 * | 5/2019 | Parmar | H04L 12/40189 |
| 2020/0143049 A1 * | 5/2020 | Kamir | B60R 16/0232 |

* cited by examiner

*Primary Examiner* — Oussama Roudani
(74) *Attorney, Agent, or Firm* — Frank Lollo; Brooks Kushman P.C.

(57) ABSTRACT

Dynamic controller area network (CAN) messaging is provided. A central gateway of a vehicle includes a processor and a storage, connected to a plurality of vehicle buses, each of the vehicle buses connected to one or more electronic control units (ECUs), The central gateway receives a message from a client of the ECUs, the message requesting a dynamic CAN signal. The message is forwarded over the plurality of vehicle buses to a server of the ECUs. A response from the server is received to the central gateway, the response specifying availability of the dynamic CAN signal. The response is forwarded to the client.

16 Claims, 36 Drawing Sheets

606 Flow Control

| Value | Description |
|---|---|
| 0 | Fastest |
| 1 | 100 ms |
| 2 | 500 ms |
| 3 | 1000 ms |

604 Send Type

| Value | Description |
|---|---|
| 0 | Once |
| 1 | On Change |
| 2 | Fixed Periodic |
| 3 | Event Periodic |

608 Query Type

| Value | Description |
|---|---|
| 0 | Request |
| 1 | Response |

302 Data Structure ID

| Value | Description |
|---|---|
| 0 | Signal Availability |
| 1 | Message ID Assignment |
| 2 | Contract |
| 3 | I/O Control |
| 4 | Configuration |
| 5 | Diagnostics |
| 6 | Future use 1 |
| 7 | Future use 2 |

| Value | Data Structure ID Description |
|---|---|
| 0 | Signal Availability |
| 1 | Message ID Assignment |
| 2 | Contract |
| 3 | I/O Control |
| 4 | Configuration |
| 5 | Diagnostics |
| 6 | Future use 1 |
| 7 | Future use 2 |

702

801

| Value | Availability Type (AT) Description |
|---|---|
| 0 | New |
| 1 | Existing |

608

| Value | Query Type Description |
|---|---|
| 0 | Request |
| 1 | Response |

| Value | Flow Control | |
|---|---|---|
| | Value | Description |
| | 0 | Fastest |
| | 1 | 100 ms |
| | 2 | 500 ms |
| | 3 | 1000 ms |

606

| Send Type | |
|---|---|
| Value | Description |
| 0 | Once |
| 1 | On Change |
| 2 | Fixed Periodic |
| 3 | Event Periodic |

604

| Data Structure ID | |
|---|---|
| Value | Description |
| 0 | Signal Availability |
| 1 | Message ID Assignment |
| 2 | Contract |
| 3 | I/O Control |
| 4 | Configuration |
| 5 | Diagnostics |
| 6 | Future use 1 |
| 7 | Future use 2 |

608 — Query Type

| Value | Description |
|---|---|
| 0 | Request |
| 1 | Response |

1404 — Contract Type

| Value | Description |
|---|---|
| 0 | Setup |
| 1 | Accept |
| 2 | Close |
| 3 | Query |

302 — Data Structure ID

| Value | Description |
|---|---|
| 0 | Signal Availability |
| 1 | Message ID Assignment |
| 2 | Contract |
| 3 | I/O Control |
| 4 | Configuration |
| 5 | Diagnostics |
| 6 | Future use 1 |
| 7 | Future use 2 |

FIG. 19 CONT.

1404 — Contract Type

| Value | Description |
|---|---|
| 0 | Setup |
| 1 | Accept |
| 2 | Close |
| 3 | Query |

608 — Query Type

| Value | Description |
|---|---|
| 0 | Request |
| 1 | Response |

1302

606 — Flow Control

| Value | Description |
|---|---|
| 0 | Fastest |
| 1 | 100 ms |
| 2 | 500 ms |
| 3 | 1000 ms |

604 — Send Type

| Value | Description |
|---|---|
| 0 | Once |
| 1 | On Change |
| 2 | Fixed Periodic |
| 3 | Event Periodic |

2102 — DNE (Does Not Exist)

| Value | Description |
|---|---|
| 0 | False |
| 1 | True (not a dynamic message) |

302 — Data Structure ID

| Value | Description |
|---|---|
| 0 | Signal Availability |
| 1 | Message ID Assignment |
| 2 | Contract |
| 3 | I/O Control |
| 4 | Configuration |
| 5 | Diagnostics |
| 6 | Future use 1 |
| 7 | Future use 2 |

FIG. 21 CONT.

| Value | Response Source – 2312 Description |
|---|---|
| 0 | Onboard |
| 1 | Cloud |

| Value | Control Type – 2304 Description |
|---|---|
| 0 | Request I/O |
| 1 | Request Value |
| 2 | Request - Completed |
| 3 | Request - Negative |

| Value | Response Type – 2306 Description |
|---|---|
| 0 | Deactivate/Off |
| 1 | Activate/On |

| Value | Data Structure ID – 302 Description |
|---|---|
| 0 | Signal Availability |
| 1 | Message ID Assignment |
| 2 | Contract |
| 3 | I/O Control |
| 4 | Configuration |
| 5 | Diagnostics |
| 6 | Future use 1 |
| 7 | Future use 2 |

FIG. 23 CONT.

| 2404 | | |
|---|---|---|
| Response Type | | |
| Value | Description | |
| 0 | Invalid Request | |
| 1 | Disabled/Not supported | |
| 2 | Failed | |
| 3 | Busy/In use | |
| 4 | Faulted | |
| 5 | Rejected | |
| 6 | Pending | |
| 7 | Future use | |

| 2304 | | |
|---|---|---|
| Control Type | | |
| Value | Description | |
| 0 | Request I/O | |
| 1 | Request Value | |
| 2 | Response - Completed | |
| 3 | Response - Negative | |

| 302 | | |
|---|---|---|
| Data Structure ID | | |
| Value | Description | |
| 0 | Signal Availability | |
| 1 | Message ID Assignment | |
| 2 | Contract | |
| 3 | I/O Control | |
| 4 | Configuration | |
| 5 | Diagnostics | |
| 6 | Future use 1 | |
| 7 | Future use 2 | |

FIG. 24 CONT.

| Value | Control Type |
|---|---|
| | Description |
| 0 | Request I/O |
| 1 | Request Value |
| 2 | Request - Completed |
| 3 | Request - Negative |

2304

| Value | Data Structure ID |
|---|---|
| | Description |
| 0 | Signal Availability |
| 1 | Message ID Assignment |
| 2 | Contract |
| 3 | I/O Control |
| 4 | Configuration |
| 5 | Diagnostics |
| 6 | Future use 1 |
| 7 | Future use 2 |

DYNAMIC CONTROLLER AREA NETWORK MESSAGING

TECHNICAL FIELD

Aspects of the disclosure generally relate to dynamic controller area network (CAN) messaging.

BACKGROUND

Vehicle components send and receive data over vehicle bus protocols such as controller area network (CAN). To communicate, the vehicle components are designed to send handcrafted data exchanges over the CAN bus. CAN message lists are effectively static, so a system operator or implementer is unable to change inputs or outputs without changing software components across multiple controllers. Network bandwidth constraints over the CAN bus prevent modules from publishing excess data, which therefore limits futureproofing of designs. Components performing real-time control tend to be designed with limited headroom for new features or functions. Such systems are often built around a basic task scheduler.

SUMMARY

In one or more illustrative embodiments, a system for dynamic controller area network (CAN) messaging is provided. The system includes a central gateway of a vehicle, including a processor and a storage, connected to a plurality of vehicle buses, with each of the vehicle buses connected to one or more electronic control units (ECUs). The central gateway is programmed to receive a message from a client of the ECUs, the message requesting a dynamic CAN signal, forward the message over the plurality of vehicle buses to a server of the ECUs, receive a response from the server, the response specifying availability of the dynamic CAN signal, and forward the response to the client.

In one or more illustrative embodiments, a method for dynamic controller area network (CAN) messaging is provided. A central gateway of a vehicle includes a processor and a storage, connected to a plurality of vehicle buses, each of the vehicle buses connected to one or more electronic control units (ECUs), The central gateway receives a message from a client of the ECUs, the message requesting a dynamic CAN signal. The message is forwarded over the plurality of vehicle buses to a server of the ECUs. A response from the server is received to the central gateway, the response specifying availability of the dynamic CAN signal. The response is forwarded to the client.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

CAN dynamic messaging refers to a strategy to dynamically create, send, and/or discontinue the sending of CAN data frames. In many cases, a CAN network may be set up in a strictly engineered fashion, wherein the network is not designed to accommodate dynamic changes. A result of such an approach is that a change in messaging (e.g., to add a signal, remove a signal, change a signal, etc.) may require a full software update across vehicle controllers. As over-the-air updates and updatable vehicle configurations become more common, it may be desirable for the messaging content along the CAN bus to no longer remain static during a vehicle lifetime. To make CAN more flexible and to accommodate such updates, a service-oriented architecture (SOA) model of data transfer over CAN may be implemented. As discussed in detail herein, such a strategy can be used to help CAN evolve from a strictly engineered network to a real-time adaptive network.

Using dynamic CAN, controllers may subscribe to new CAN signals when desired and unsubscribe when the signals are longer required. Using this approach, sending of new signals can be negotiated dynamically. Each signal in a global signal database of all vehicle CAN messages may be assigned a unique signal number. A signal broker may maintain the database of signals and may ensure that the available data elements that each sender is responsible for may be made available selectively. New signals can be subscribed to using these signal numbers. Using the subscription approach, lead time and cost for updating sender software may be reduced whenever new features requiring new signals are developed. Further aspects of the SOA for dynamic CAN are discussed in detail herein.

Figure 1:
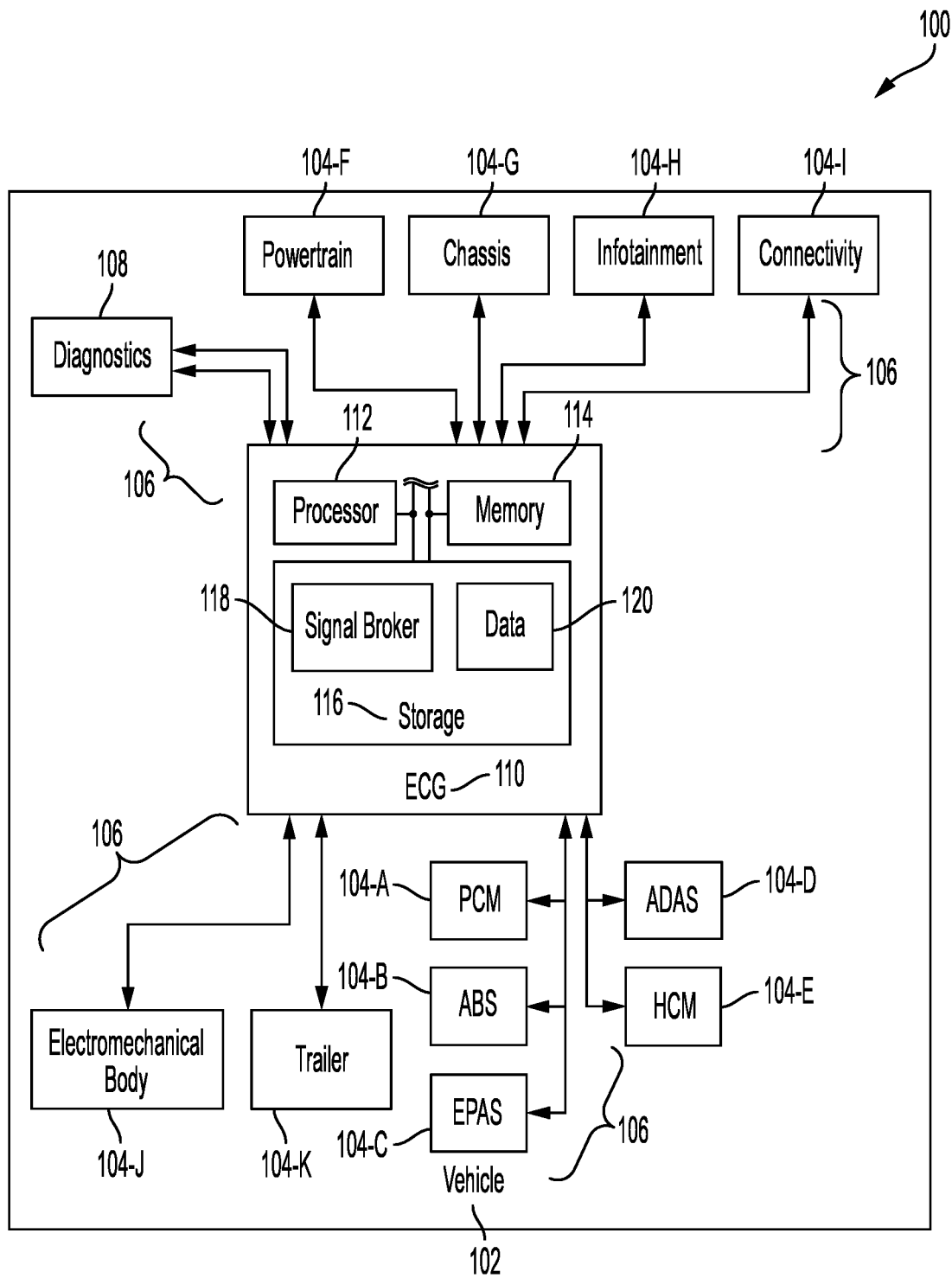
FIG. 1 illustrates an example system including an enhanced central gateway (ECG) configured for dynamic CAN messaging.

FIG. 1 illustrates an example system 100 including an enhanced central gateway (ECG) 110 configured for dynamic CAN messaging. The enhanced central gateway 110 may be connected to a plurality of electronic control units (ECUs) 104 over one or more vehicle buses 106. The enhanced central gateway 110 may also include one or more diagnostic ports 108. The enhanced central gateway 110 may include a processor 112, a memory 114, and a storage 116 for a signal broker 118 and/or data 120. While an example system 100 is shown in FIG. 1, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors. In another example, the vehicle 102 may be a pure electric vehicle driven by electric motors only.

The vehicle 102 may include a plurality of electronic control units (ECUs) 104 configured to perform and manage various vehicle 102 functions under the power of the vehicle battery and/or drivetrain. As depicted, the example vehicle ECUs 104 are represented as discrete ECUs 104-A through 104-H. However, the vehicle ECUs 104 may share physical hardware, firmware, and/or software, such that the functionality from multiple ECUs 104 may be integrated into a single ECU 104 or distributed across a plurality of ECUs 104. The vehicle ECUs 104 may include various vehicle 102 components configured to receive updates of associated software, firmware, or configuration settings.

As some non-limiting vehicle ECUs 104 examples: a powertrain control module (PCM) 104-A may be configured to control engine and transmission components; an antilock brake system (ABS) 104-B controller configured to control brake and traction control components; an electric power-assisted steering (EPAS) 104-C controller configured to control steering assistance and adjust pull or drift compensation functions; advanced driver assistance systems (ADAS) 104-D such as adaptive cruise control or automate braking; and a headlamp control module (HCM) 104-E configured to control light on/off settings. The ECUs 104 may also include other powertrain 104-F or chassis 104-G components, an infotainment system 104-H configured to support voice command and BLUETOOTH interfaces with the driver and driver carry-on devices (e.g., the SYNC system provided by Ford Motor Company of Dearborn, MI), a connectivity controller 104-I such as a telematics control unit (TCU) configured to utilize an embedded modem to access networked devices external to the vehicle 102, electromechanical body controllers 104-J such as window or lock actuators, and trailer controller 104-K components such as light control and sensor data to support connected trailers.

The vehicle bus 106 may include various methods of communication available between the vehicle ECUs 104. The vehicle bus 106 may also support communication between the ECG 110 and the vehicle ECUs 104. The vehicle bus 106 may be a vehicle controller area network (CAN). The CAN network may be of various types, including, but not limited to, high speed CAN (HS-CAN) having a data capacity of up to 500 kbps, mid-speed CAN (MS-CAN) having a data capacity of up to 125 kbps, and/or CAN flexible data rate (FD-CAN) having a data capacity of up to 2000 kbps or higher. It should be noted that the illustrated bus topology is merely an example, and other numbers and/or arrangements of vehicle buses 106 may be used.

The vehicle 102 may further include diagnostic ports 108 that may be used by external devices to monitor the status of the vehicle 102. In an example, the diagnostic port 108 may be an on-board diagnostics (OBD) port connected to the vehicle bus 106. A user may connect a dongle, code reader, or other scan device to the diagnostic port 108, and may use the connection provided by the diagnostic port 108 to gain access to messages traversing the vehicle bus 106. Once connected, a user may utilize the connected scan device to capture diagnostic codes, monitor vehicle health, or, in some cases, adjust vehicle settings. In one non-limiting example, similar to the speed of HS-CAN, the CAN diagnostic ports 108 may support data capacity of up to 500 kbps. Other example types of diagnostic port 108 bus are possible as well.

The ECG 110 may be configured to provide an electrical interface between the vehicle buses 106 used to communicate within the vehicle 102. In an example, the ECG 110 may be configured to translate signals and commands between the CAN buses 106 connected to the ECG 110. In a non-limiting possibility, the ECG 110 may support connection to up to ten CAN vehicle buses 206.

As a specific non-limiting example, the ECG 110 may be connected to the powertrain 104-F components over a HS-CAN vehicle bus 106; to the chassis components 104-G, safety systems and a cluster over a second HS-CAN vehicle bus 106; to the infotainment system 104-H over a third HS-CAN vehicle bus 106; to the connectivity 104-I and Ethernet security backup systems over a fourth HS-CAN vehicle bus 106; to the electromechanical body controllers 104-J over a first MS-CAN bus; to the trailer controller 104-K and/or nodes readily accessed from the exterior of the vehicle 102 over a second MS-CAN vehicle bus 106; to a diagnostic port 108 over first and second diagnostic data vehicle bus 106 connections; to the PCM 104-A, ABS 104-B, EPAS 104-C, and other controllers over a first FD-CAN vehicle bus 106; and to the ADAS 104-D, HCM 104-E and other controllers over a second FD-CAN vehicle bus 106. In another example, the infotainment 104-H, connectivity 104-I, cluster 104-L, heads-up display 104-M, and ADAS 104-D are each connected to the ECG 110 via separate vehicle buses 106. In yet another example the heads-up display 104-M may be integrated with the cluster 104-L.

The ECG 110 may be further configured to provide computing functionality in support of the domain CAN messaging of the vehicle 102. For instance, the ECG 110 may include one or more processors 112 configured to perform instructions, commands, and other routines in support of the processes described herein. In an example, the ECG 110 may be configured to execute instructions of the signal broker 118 loaded to a memory 114 of the ECG 110 from a storage medium 116 of the ECG 110. The signal broker 118 may include software code programmed to support the dynamic CAN messaging discussed in detail herein. The data 120 may include signal and contract assignment information as well as other information in support of the dynamic CAN messaging.

The signal broker 118 and data 120 may be maintained in a non-volatile manner using a variety of types of computer-readable storage medium 116. The computer-readable medium 116 (also referred to as a processor-readable medium or storage) includes any non-transitory medium (e.g., a tangible medium) that participates in providing instructions or other data that may be read by the processor 112 of the ECG 110. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. As one specific example, the ECG 110 may be provisioned with at least 128 megabytes of RAM, as well as 2-4 cores of processor 112 for processing power to enable various computing tasks.

Figure 2:
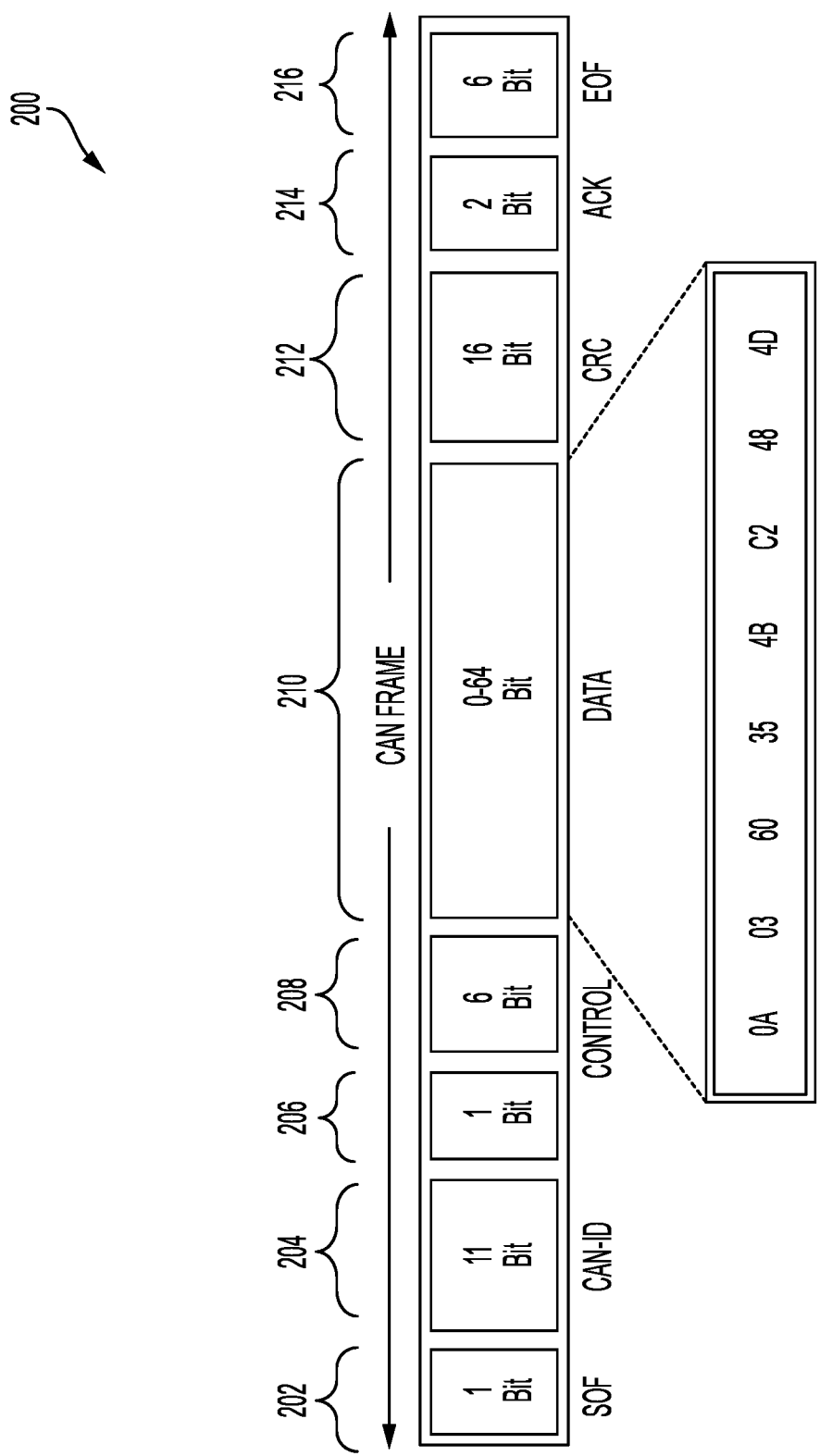
FIG. 2 illustrates an example CAN data frame supporting dynamic CAN messaging.

FIG. 2 illustrates an example CAN data frame 200 supporting dynamic CAN messaging. As shown, the CAN frame includes a start of frame (SOF) bit 202, an 11-bit CAN-ID 204, a remote transmission request (RTR) bit 206, a 2-bit reserved area and a 4-bit data length code 208, a data field 210 of up to 64 bits, a 16-bit cyclic redundancy check (CRC) 212 including a 15-bit code and a 1-bit CRC delimiter, an acknowledgement 214 including an acknowledgement bit and acknowledgement delimiter bit, and a 6-bit end-of-frame (EOF) marker 216. As further shown in the illustration, the example data field 210 portion is represented as hexadecimal values. It should be noted that the values of the illustrated data field 210 portion is purely for sake of example, and arbitrary data may be used.

Figure 3:
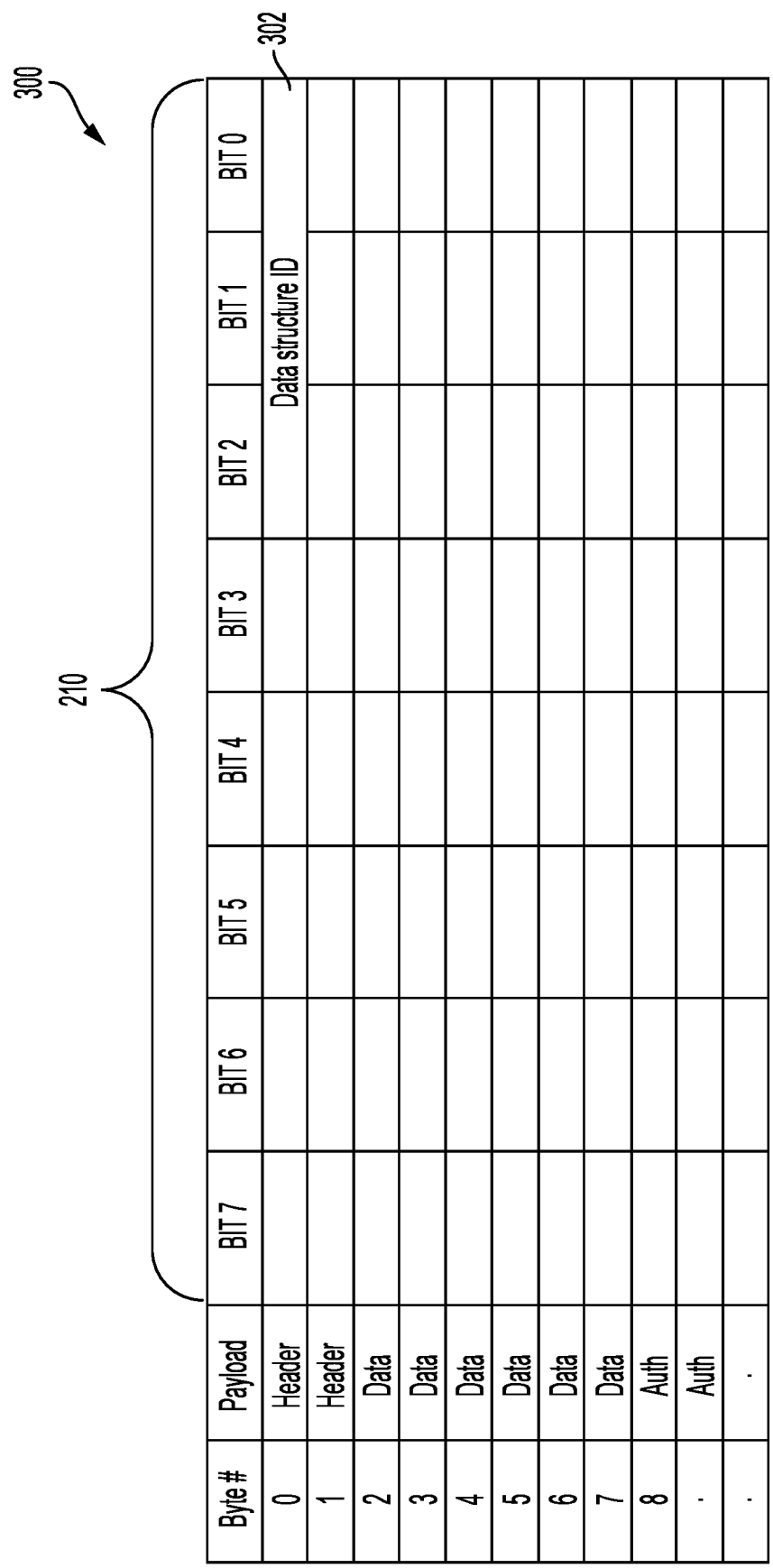
FIG. 3 illustrates an example representation of the data field of the CAN data frame divided into individual bits.

FIG. 3 illustrates an example representation 300 of the data field 210 of the CAN data frame 200 divided into individual bits. Each column represents one bit and each row is one byte (bit 0 to bit 7). Byte #0 is the first byte of the message, where bit 0 is the LSB and bit 7 is the MSB. Consistent with CAN, transmission bit ordering in the example follows the Big-Endian convention, i.e., the most significant bit in the sequence is stored and/or sent first. In general, the first two bytes of the data field 210 may serve as a header for the dynamic CAN messaging, while the remainder of the bytes of the data field 210 may serve as the message payload. As shown, the first three bits form a data structure ID 302 which defines what the message will be used for and what to expect in the other bit locations.

It should be noted that in this message example representation 300, as well as for all other message examples herein, while specific values and orders of values are shown in the data structures, these are only examples and different mappings of values to functions and different orders of fields are contemplated and may be used. As some other possibilities, multiple of the illustrated fields may be combined into a single field, one or more fields may be separated into other fields, etc.

Figure 4:
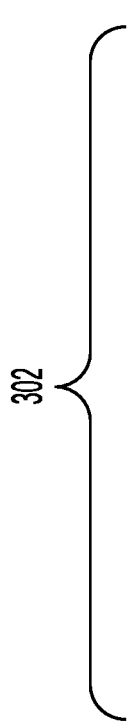
FIG. 4 illustrates an example representation of possible data structure IDs to be utilized in the first three bits of the data portion of the CAN frame.

FIG. 4 illustrates an example representation of possible data structure IDs 302 to be utilized in the first three bits of the data portion of the CAN frame. As three bits are allocated in the example for data structure IDs 302, eight possible values may be represented by the data structure IDs 302. In the illustrated example a value of zero signifies a signal availability message, a value of one signifies a message ID assignment message, a value of two signifies a contract message, a value of three signifies an I/O control message, a value of four signifies a configuration message, and a value of five signifies a diagnostics message. In the illustrated example, the values of six and seven are unused but may be made available for future use. Again, these choices of values and quantity of bits may vary in different implementations.

A signal subscription model may be used to allow clients (sometimes referred to herein as requesters) to subscribe to servers (sometimes referred to herein as resource providers). The signal subscription approach may include four phases: discovery, contract setup, regular message transmission, and contract termination. The discovery phase may include a signal availability request data flow, a signal availability response data flow, and a signal to message ID assignment data flow. The contract setup phase may include a contact setup data flow and a contract accept/reject data flow. The regular message transmission phase may then be performed once the contract is set up. The contract termination phase may include a close contract request data flow. Each of these phases is discussed in turn in FIGS. 5-17.

Figure 5:
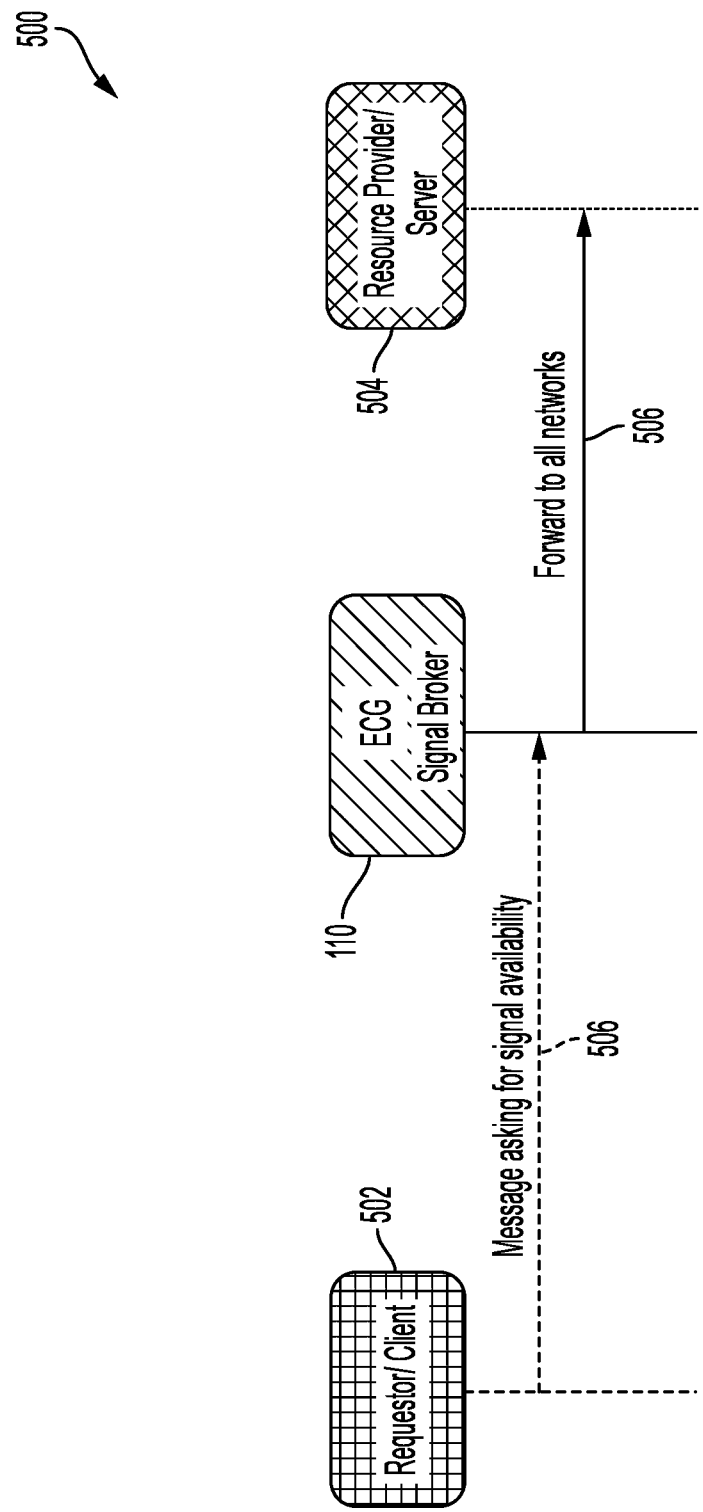
FIG. 5 illustrates an example signal availability data flow portion of the discovery phase.

FIG. 5 illustrates an example signal availability data flow 500 portion of the discovery phase. The signal availability data flow 500 may be used to allow a client 502 to determine whether a requested signal is available from a server 504. In an example, the client may be one of the ECUs 104, and the server 504 may be another one of the ECUs 104. The client 502 may send a signal availability request message 506 asking for signal availability to the ECG 110. Responsive to receipt of the message 506, the ECG 110 may forward the signal availability message 506 to all CAN buses 106 connected to the ECG 110.

Figure 6:
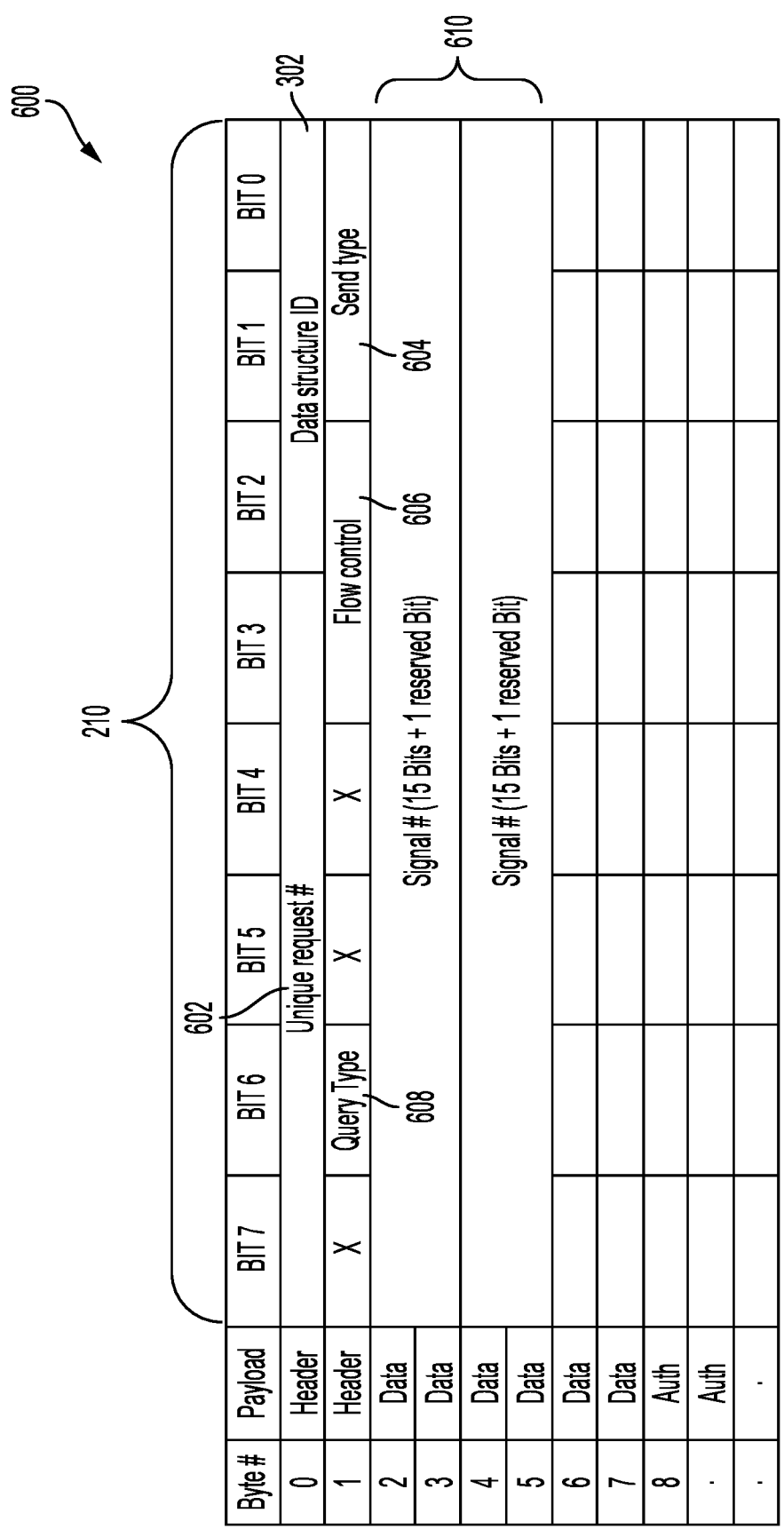
FIG. 6 illustrates an example of details of the structure of the signal availability request message.

FIG. 6 illustrates an example of details of the structure 600 of the signal availability request message 506. The format of the example structure 600 is shown consistent with illustration of the representation 300 of the data field 210 of the CAN data frame 200 divided into individual bits. It should be again noted that while specific values and orders of values are shown in the structure 600, this is only one example and different mappings of values to functions and different orders of fields may be used.

As discussed previously, the data structure ID 302 may be indicated by the first three bits of the data field 210. Additionally, the next five bits of the data field 210 may include a unique request number 602. The unique request number 602 may be a unique value, such as an increasing value or random value specific to the signal availability request message 506. This request number 602 may be used to allow specific requests to be readily tracked and/or accessed by the parties along the buses 106.

The next two bits of the data field 210 may include a send type 604. The send type 604 may indicate a type of the transmission. In the illustrated example, a value of zero may indicate a message that is sent once, a value of one may indicate a message that is responsive to a change, a value of two may indicate a fixed periodic time for sending the message, and a value of three may indicate a message that is sent periodically responsive to an event.

The next two bits of the data field 210 may include a flow control 606 specifier. For instance, a value of 0 may indicate a fastest quality of service is requested, a value of 1 may indicate a quality of service of 100 milliseconds (ms), a value of 3 may indicate a quality of service is requested of 500 ms, and a value of 4 may indicate a quality of service is requested of 1000 ms.

The next two bits of the data field 210 may be reserved. The next bit of the data field 210 may indicate a query type 608 of the message. For insistence a value of zero may indicate a request message, and a value of one may indicate a response message. The next bit of the data field 210 may be reserved.

Figure 9:
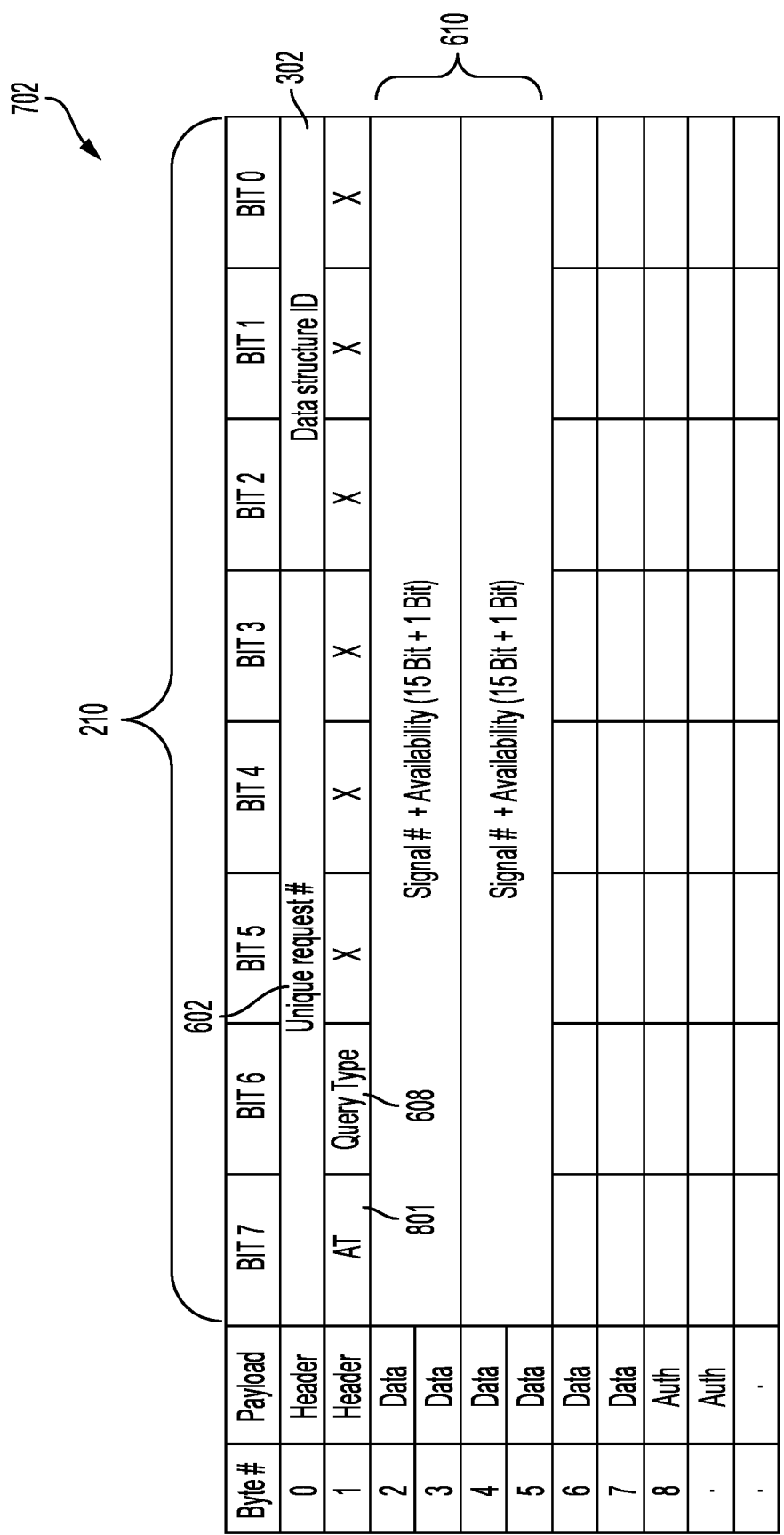
FIG. 9 illustrates an example of details of the signal availability response message for a signal that is newly available over the CAN bus.
Figure 9:
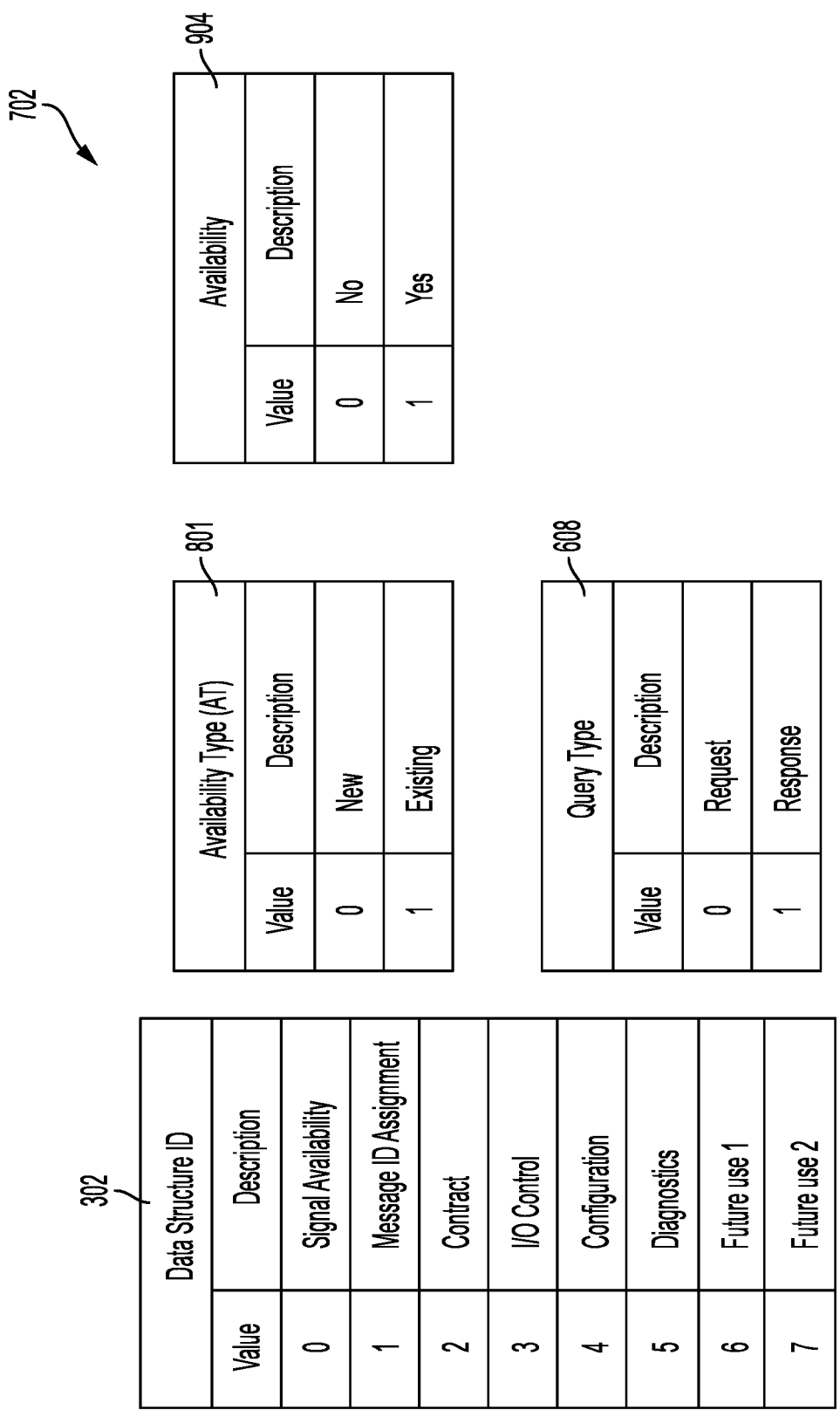

The following bits of the data field 210 may include signal 610 details of the signal availability request message 506. For instance, the next 16 bits may indicate an identifier of a signal 610. The signal 610 may be specified as a 15-bit identifier plus a reserved bit (which may be used later as shown in FIG. 9). In some examples, multiple signals 610 may be specified by the signal availability request message 506. For instance, a further 16 bits of the data field 210 may indicate a second identifier of a second signal 610 whose availability is being requested.

Figure 7:
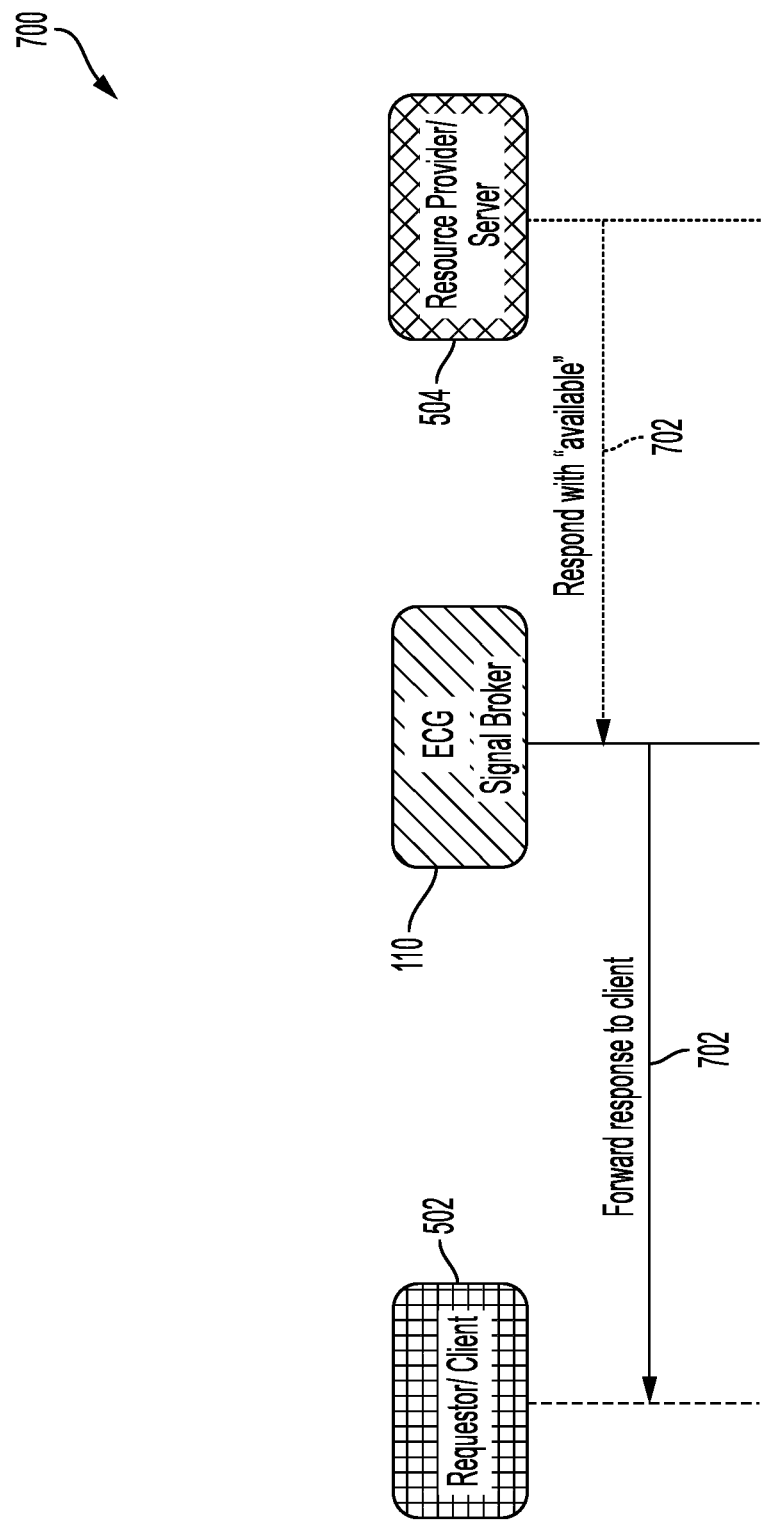
FIG. 7 illustrates an example signal availability response data flow portion of the discovery phase.
Figure 11:
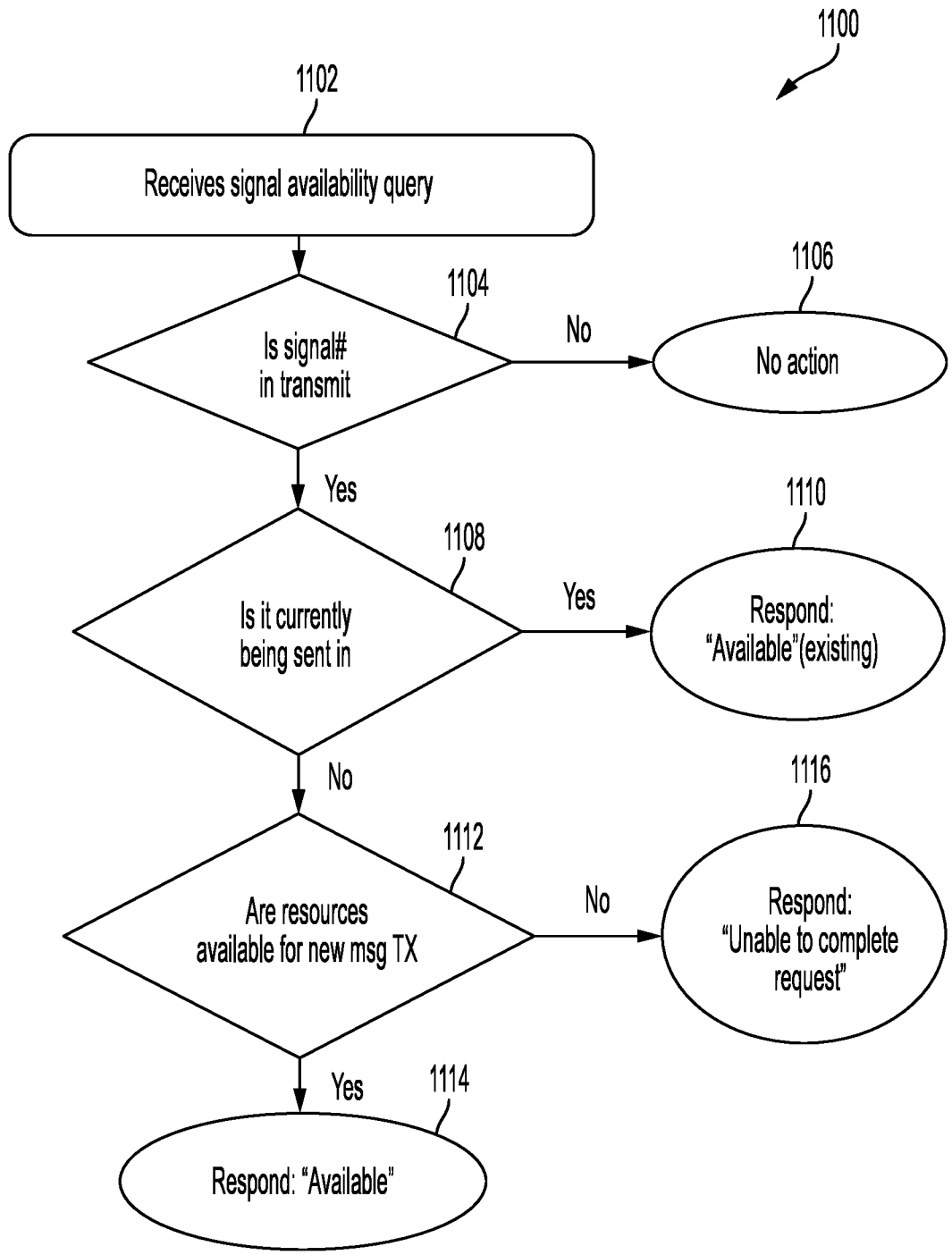
FIG. 11 illustrates an example process for responding to the signal availability request message with the signal availability response message.

FIG. 7 illustrates an example signal availability response data flow 700 portion of the discovery phase. The signal availability response data flow 700 may be used to allow a client 502 to receive a signal availability response 702 whether a requested signal is currently available from the server 504 or could be made available from the server 504. Responsive to receipt of the signal availability request message 506, the server 504 may perform a process 1100 as shown in FIG. 11 for determining whether to response to the signal availability request message 506. If the signal (or signals) specified in the signal availability request message 506 are available via the server 504, the signal availability response message 702 may be sent from the server 504 back to the client 502.

Figure 8:
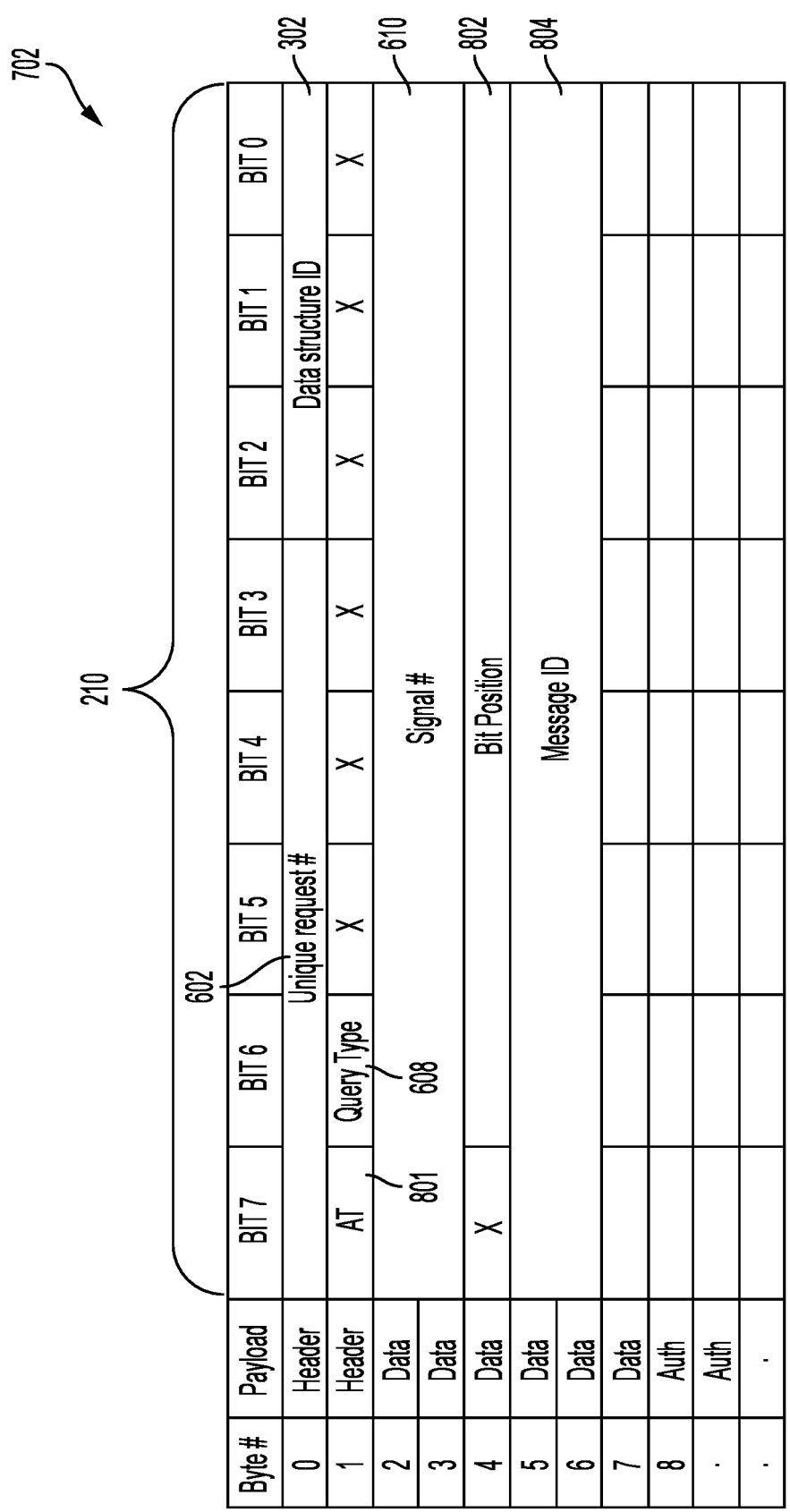
FIG. 8 illustrates an example of details of the structure of the signal availability response message for a signal that is already available over the CAN bus.

FIG. 8 illustrates an example of details of the structure of the signal availability response message 702 for a signal 610 that is already available over the CAN bus 106. The format of the example structure 800 is shown consistent with illustration of the representations 300 and 600 of the data field 210 of the CAN data frame 200.

Similar to the signal availability request message 506, the signal availability response message 702 header includes the data structure ID 302. The signal availability response message 702 header may also include the unique request ID 602 and query type 608 of the signal availability request message 506 to which the signal availability response message 702 is a response. This may allow the client 502 to readily match responses 702 to requests 506.

As further shown, the header of the signal availability response message 702 includes an availability type 801 bit, which in general specifies whether the signal 610 is being newly available or, in the alternative, was already available over CAN. For the illustrated message, the availability type 801 would indicate that this is an existing available signal 610.

The following bits of the data field 210 may include signal 610 details of the signal availability response message 506. For instance, the next 16 bits may indicate the identifier of the signal 610 being responded to. Additionally, the payload of the data field 210 may further include a bit position 802 within a CAN message and message ID 804 of such CAN message that together specify a current location of the requested signal 610 over the CAN bus 106. A recipient of the signal availability response message 702 may therefore retrieve the requested value by watching the CAN bus for the specified message ID 804 and then checking the bit position 802 of that CAN message.

FIG. 9 illustrates an example of details of the signal availability response message 702 for a signal 610 that is newly available over the CAN bus 106. As compared to the signal availability response message 702 shown in FIG. 8, in FIG. 9 the availability type 801 would indicate that this is a newly available signal 610. Additionally, the message payload may include the 15-bit identifiers of the signal 610 (or signals 610) being requested to be made available, with the reserved 16th bit specifying whether or not that specific signal 610 can be made available (e.g., 1 for yes, 0 for no).

Figure 10:
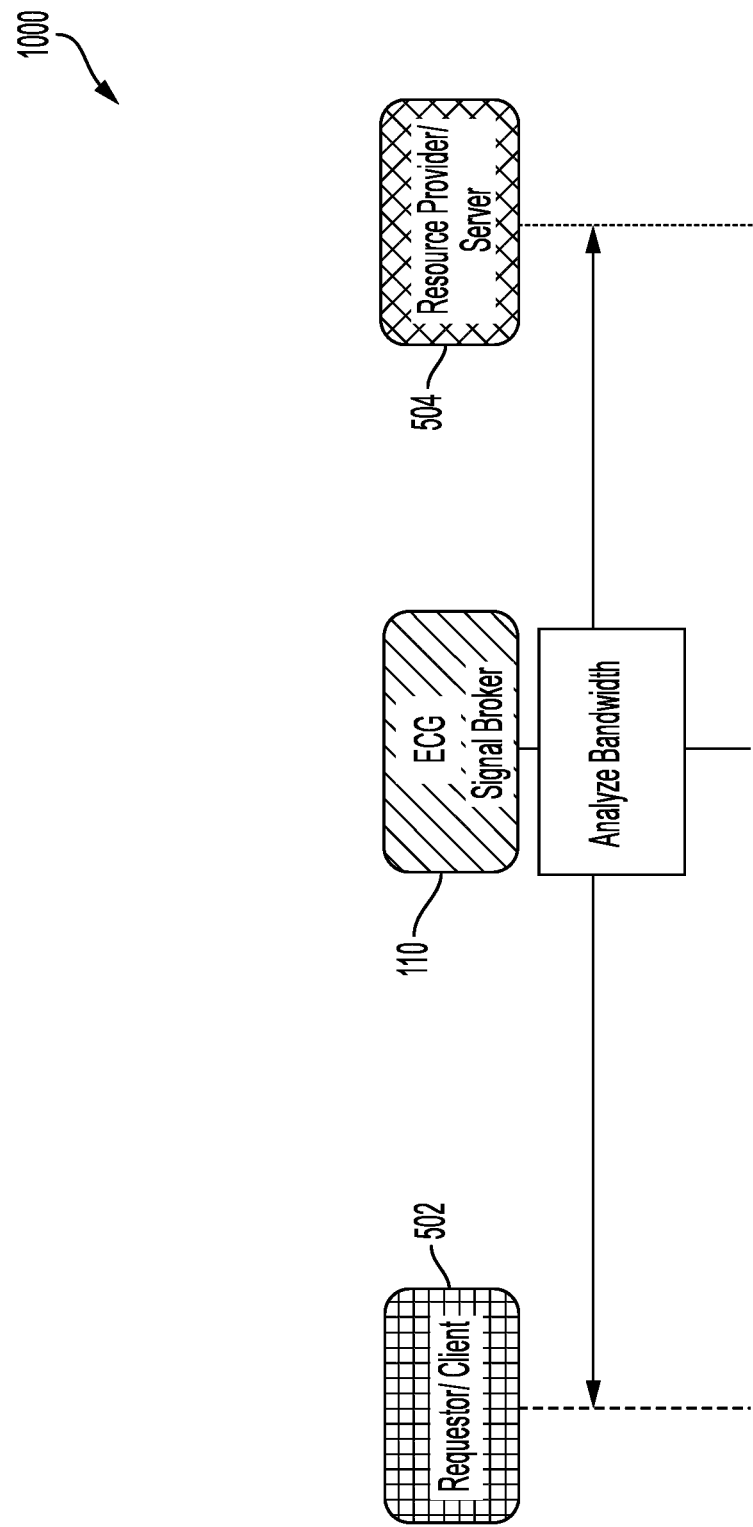
FIG. 10 illustrates an example signal bandwidth analysis data flow portion of the discovery phase.
Figure 12:
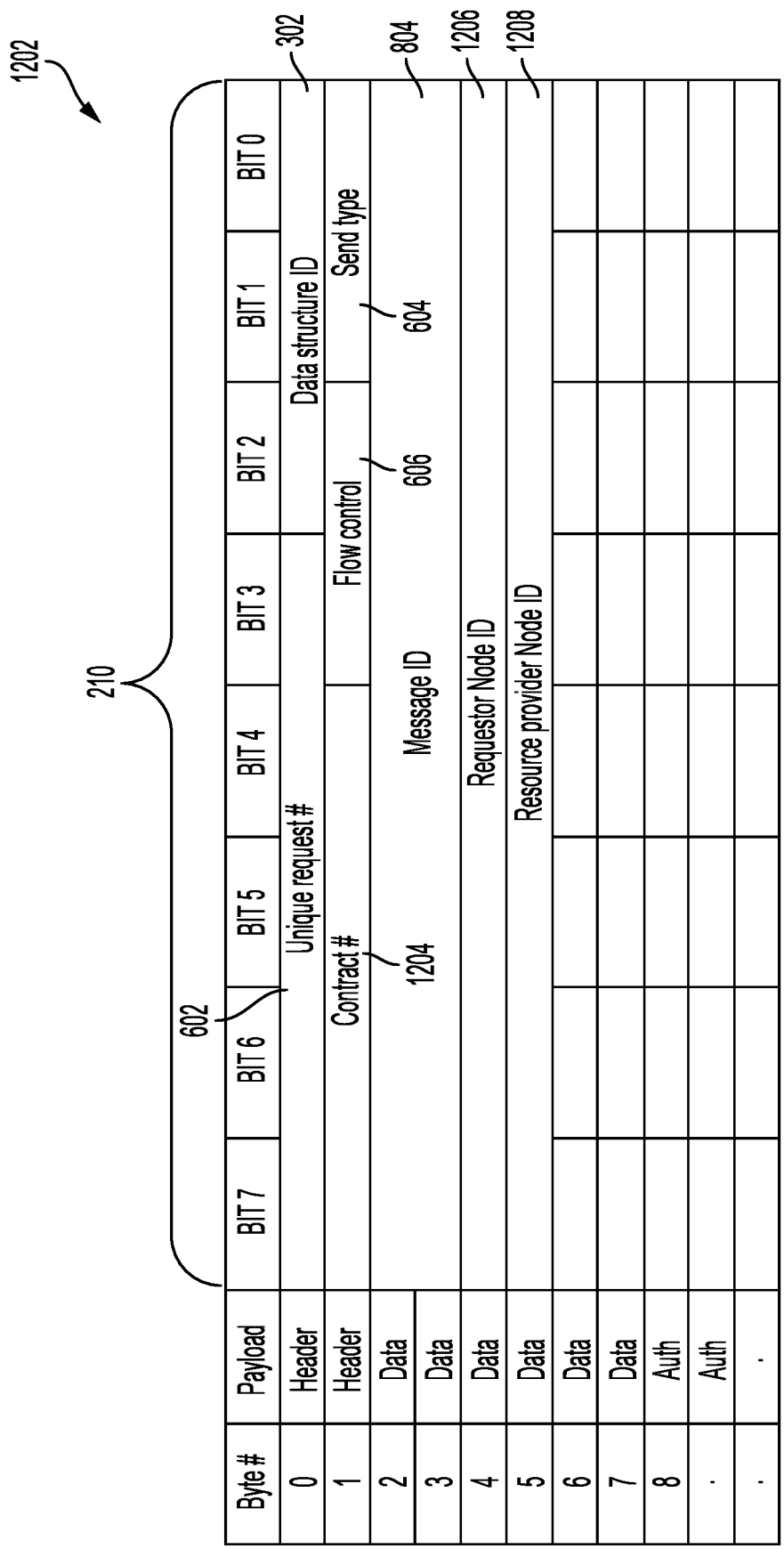
FIG. 12 illustrates an example of details of the message identifier assignment message for a signal made available over the CAN bus.

FIG. 10 illustrates an example signal bandwidth analysis data flow 1000 portion of the discovery phase. The signal bandwidth analysis data flow 1000 may be used to allow the ECG 110 to confirm to the client 502 that the requested signal 610 is within the capabilities of the system to be provided by the server 504. As shown, the ECG 110 may analyze the bandwidth on the CAN bus 106 between the server 504 and the client 502. If the bandwidth utilization of the bus 106 is less than a predefined amount (additional bandwidth is available for the signal 610), then the ECG 110 may assign a new CAN message ID, allowed rate, and contract number (discussed in further detail below) for the signal 610. This information may be communicated to the client 502 and server 504 in a message identifier assignment message 1202 as shown in FIG. 12.

FIG. 11 illustrates an example process 1100 for responding to the signal availability request message 506 with the signal availability response message 702. In an example, the process 1100 may be performed by a server 504 in the context of the disclosed system 100, including the ECG 110 and client 502.

As shown at operation 1102, the client 502 may send a signal availability request message 506 asking for signal availability to the ECG 110. Responsive to receipt of the message 506, the ECG 110 may forward the signal availability message 506 to all CAN buses 106 connected to the ECG 110. This message may be received by the server 504 connected to one of the CAN buses 106.

At operation 1104, the server 504 determines whether the signal 610 number from the signal availability request message 506 is in transmit. If the signal 610 is not one that is available or being sent by the server 504, the server 504 takes no action as shown at operation 1106. If, however, the signal 610 is one that is available or being sent by the server 504, control continues to operation 1108.

At operation 1108, the server 504 determines whether the signal 610 is currently being sent by the server 504. For instance, the signal 610 may have already been requested by another client 502 for transmission over the CAN bus 106. If so, control passes to operation 1110 to send a signal availability response message 702 indicating that the signal 610 is already available. An example of such a message 702 is discussed above with respect to FIG. 8. After operation 1110, the process 1100 ends. If, however, the signal 610 is not currently being sent by the server 504, control passes to operation 1112.

At operation 1112, the server 504 determines whether resources are available at the server 504 to send the requested signal 610. In an example, the ECG 110 may ensure that bandwidth to commit to sending the signal 610 is available between the client 502 and the ECG 110 as well as between the server 504 and the ECG 110. If so, a new CAN message ID, allowed rate, and contract number for the signal 610 are received by the server 504 as sent from the ECG 110, as noted with respect to FIG. 10.

Thus, if networking resources are available, control passes to operation 1114 to send a signal availability response message 702 indicating that the signal 610 is now available. An example of such a message 702 is discussed above with respect to FIG. 9. If networking resources are not available, control passes to operation 1116, at which the server 504 (or the ECG 110) sends a signal availability response message 702 indicating that the server 504 is unable to provide the signal 610 at the current time or for current bus 106 conditions.

FIG. 12 illustrates an example of details of the message identifier assignment message 1202 for a signal 610 made available over the CAN bus 106. Responsive to the ECG 110 assigning the message ID to pack the signal 610 that was requested in the discovery phase, the ECG 110 may provide the message identifier assignment message 1202 to the ECUs 104.

As shown, the message identifier assignment message 1202 includes the data structure ID 302, the unique request number 602, the send type 604, the flow control 606, and the message ID 804 as discussed above. The message identifier assignment message 1202 may further include a contract number 1204 in the header portion of the data field 210 which specifies a unique identifier of the contract to be negotiated as provided by the ECG 110. The message identifier assignment message 1202 may also indicate a requestor node identifier 1206, which is an identifier of the client 502, as well as a resource provider node identifier 1208, which is an identifier of the server 504.

Figure 13:
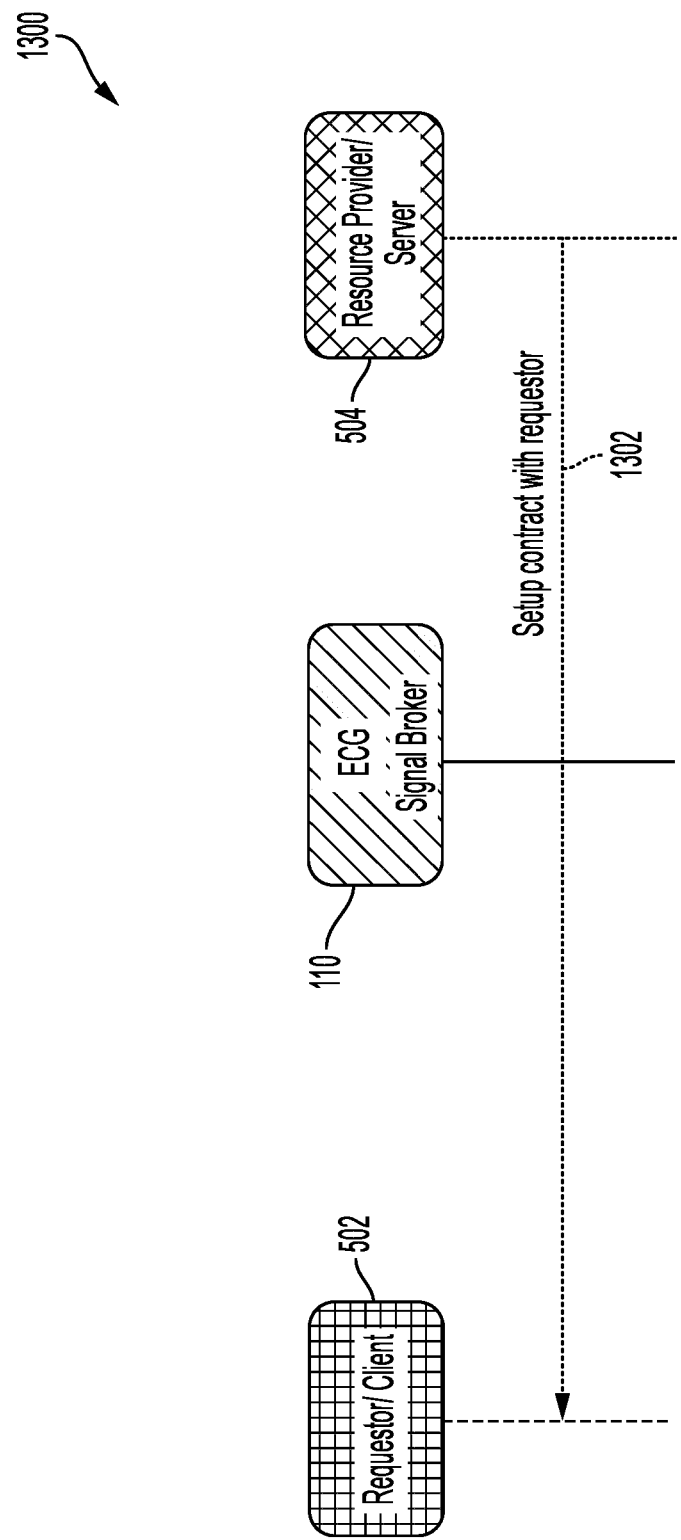
FIG. 13 illustrates an example contact initiation data flow portion of the contract setup phase.

FIG. 13 illustrates an example contact initiation data flow 1300 portion of the contract setup phase. Responsive to receiving the message identifier assignment message 1202, the server 504 negotiates the contract with the requestor client 502 to confirm message details such as speed, periodicity, and the bit position of the signal 610 within the CAN message data field 210. This information may be communicated from the server 504 to the client 502 in a contract message 1302.

Figure 14:
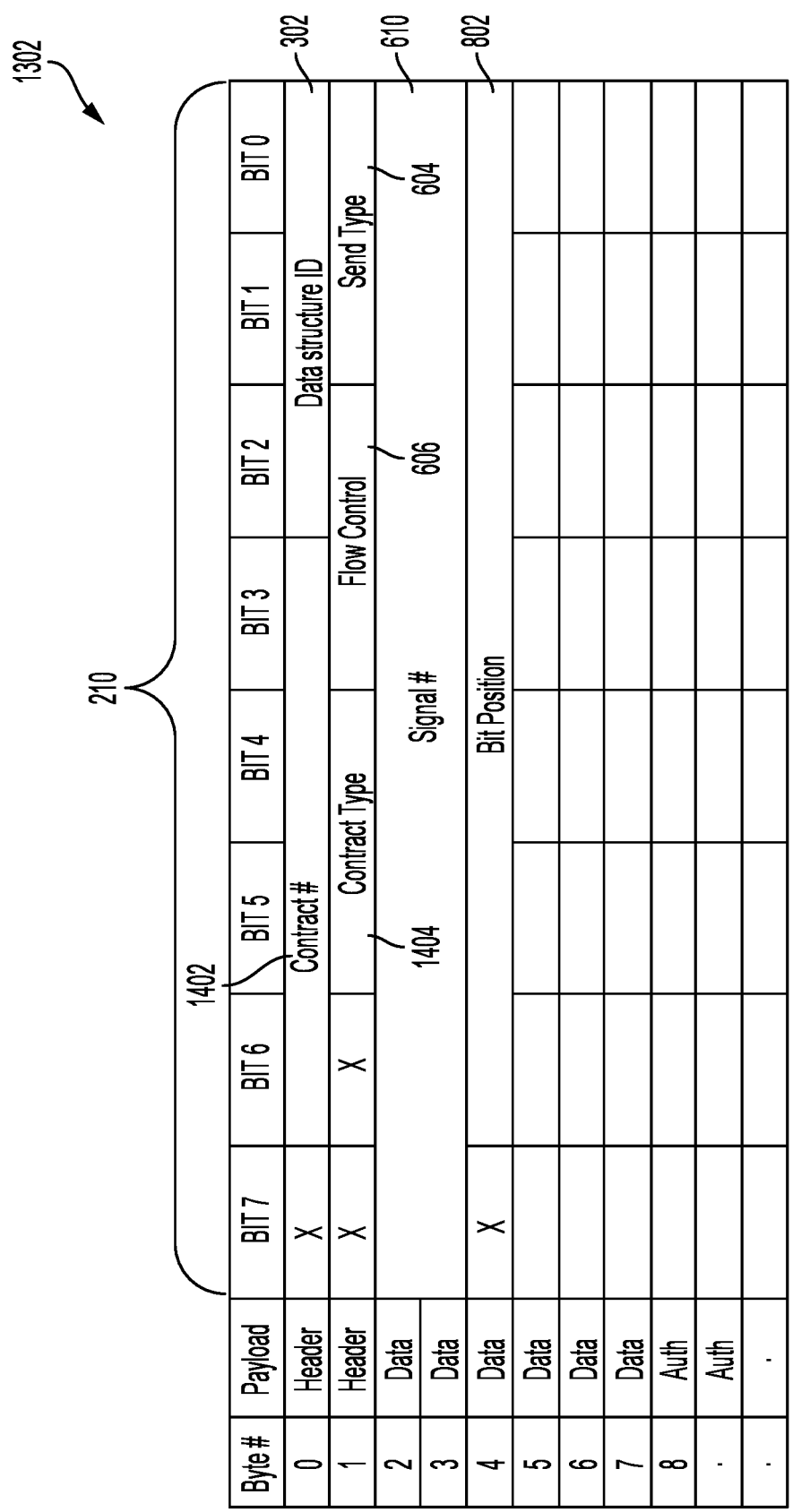
FIG. 14 illustrates an example of details of the contract message for a signal made available over the CAN bus.
Figure 14:
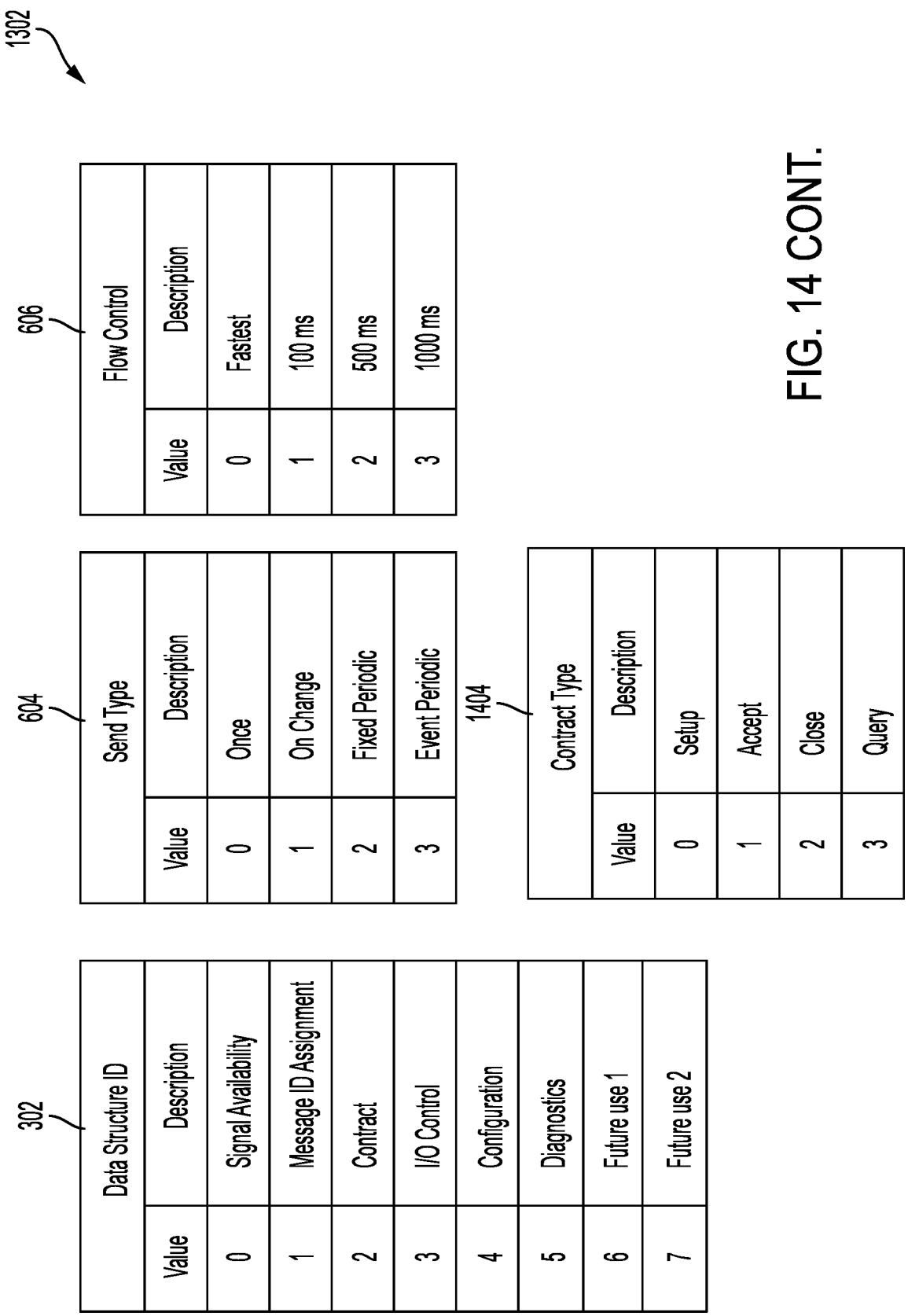

FIG. 14 illustrates an example of details of the contract message 1302 for a signal 610 made available over the CAN bus 106. Various details of the contract setup message 1302, such as the data structure ID 302, the send type 604, the flow control 606, the signal number 610, and the bit position 802 have been discussed. Of particular note, however, is the contract number 1204 in the header which specifies a unique identifier of the contract as provided by the ECG 110, as well as the contract type 1404. The contact type 1404 may specify as aspect of the type of contract setup message 1302 being provided. For instance, a value of zero may indicate a setup message, a value of one may indicate an accept message, a value of two may indicate a close message, and a value of three may indicate a query message.

Figure 15:
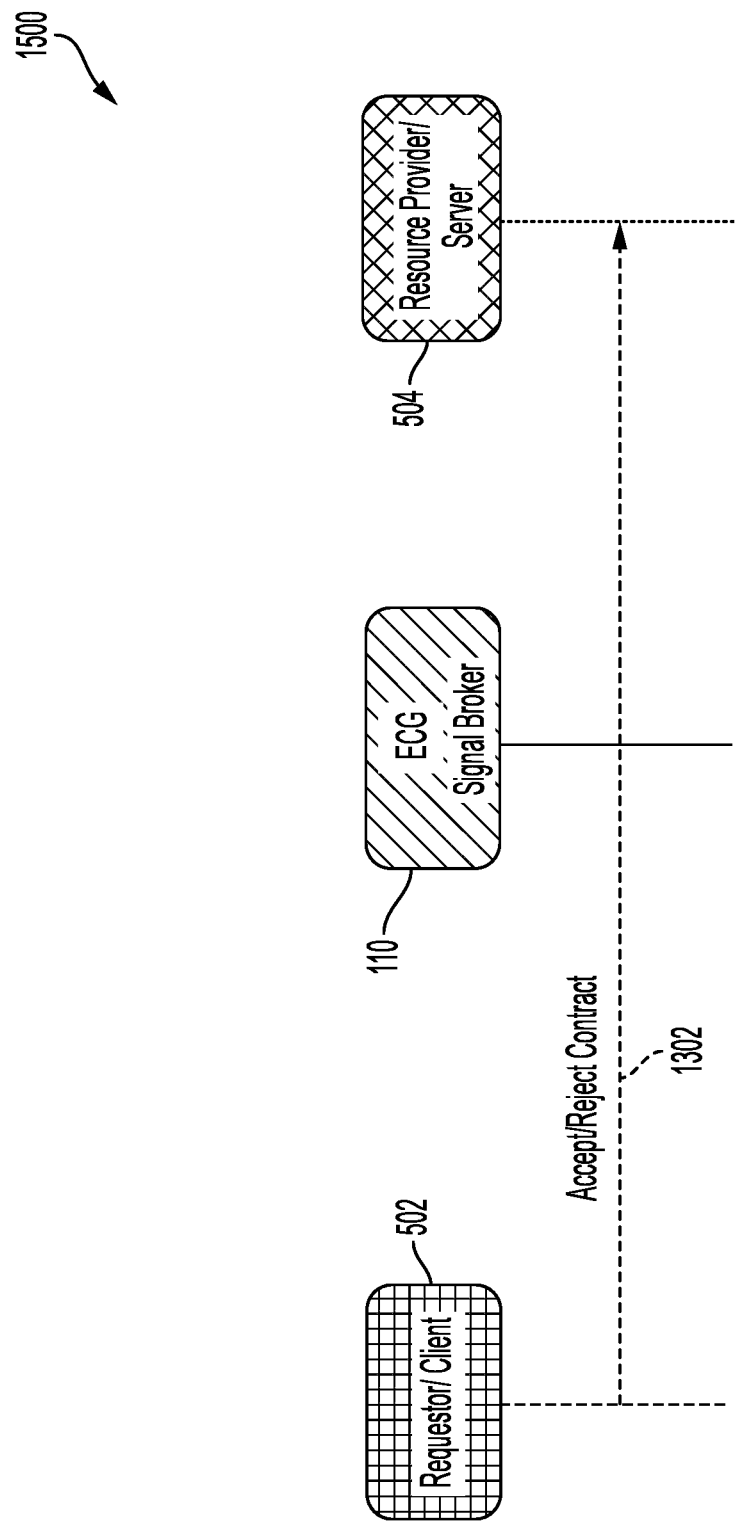
FIG. 15 illustrates an example contact acceptance/rejection data flow portion of the contract setup phase.

FIG. 15 illustrates an example contact acceptance/rejection data flow 1500 portion of the contract setup phase. Responsive to the receipt of the contract message 1302 by the client 502 as sent in the contact initiation data flow 1300 shown in FIG. 13, the client 502 sends a contract message 1302 in response to accept or reject the proposed terms in the request contract message 1302.

Figure 16:
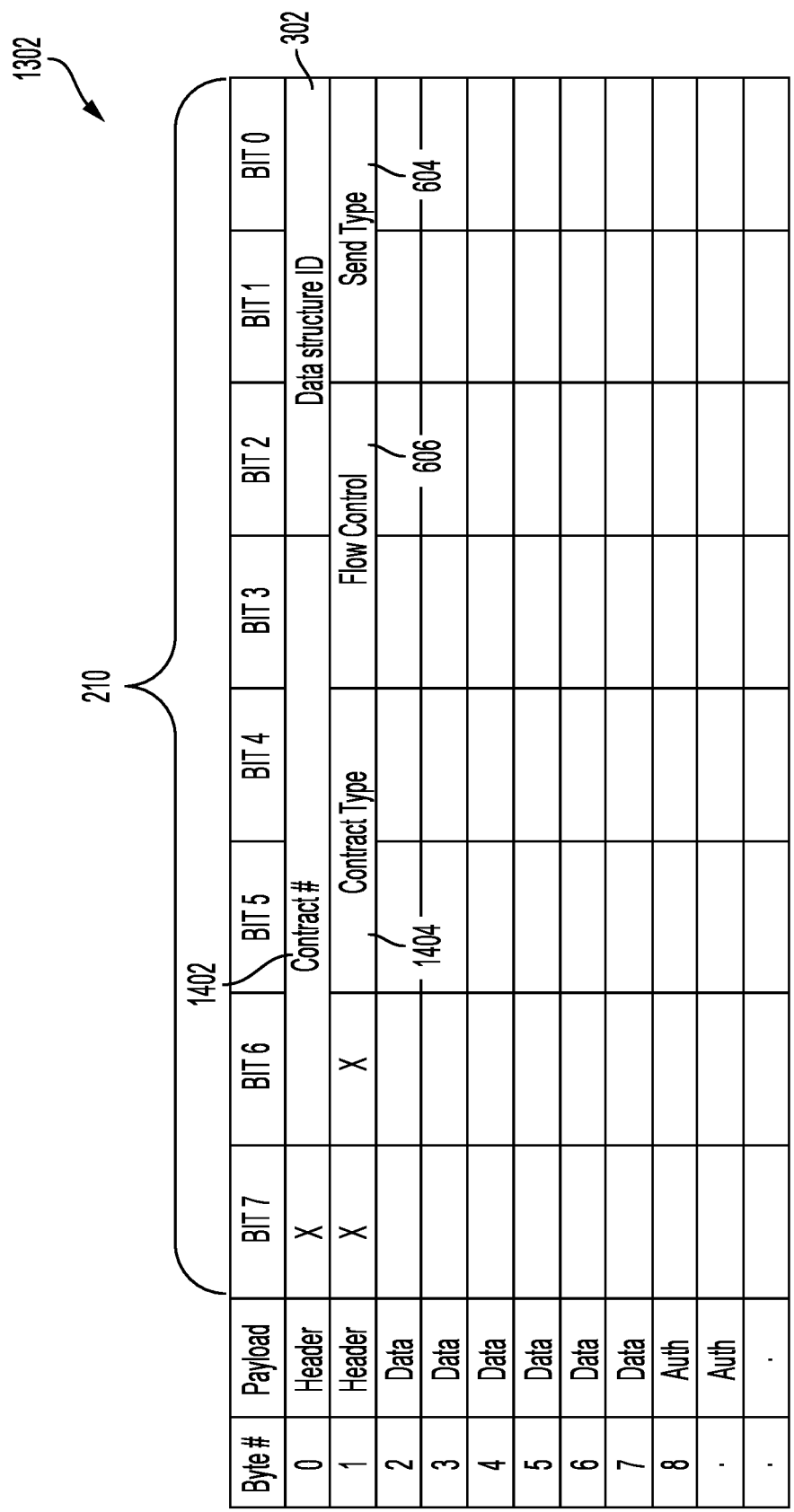
FIG. 16 illustrates an example of a response contract message.
Figure 16:
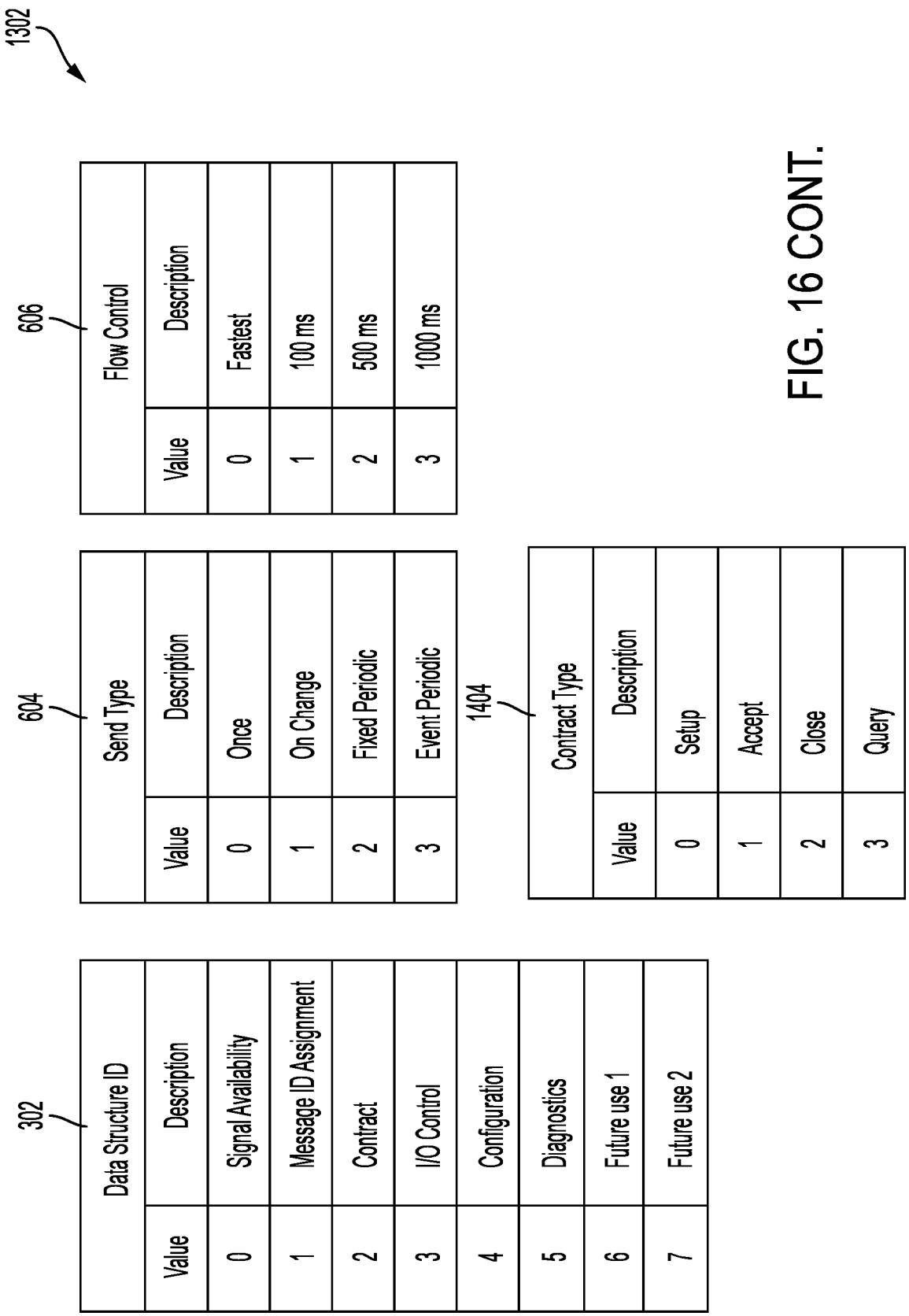

FIG. 16 illustrates an example of a response contract message 1302. Similar to as discussed with respect to FIG. 14, the details of the contract message 1302 are provided. In the example here, the contract type 1404 may be set to accept for an acceptance of the contract message 1302 request of type setup and may be set to close if the contract message 1302 request is not acceptable to the client 502.

Figure 17:
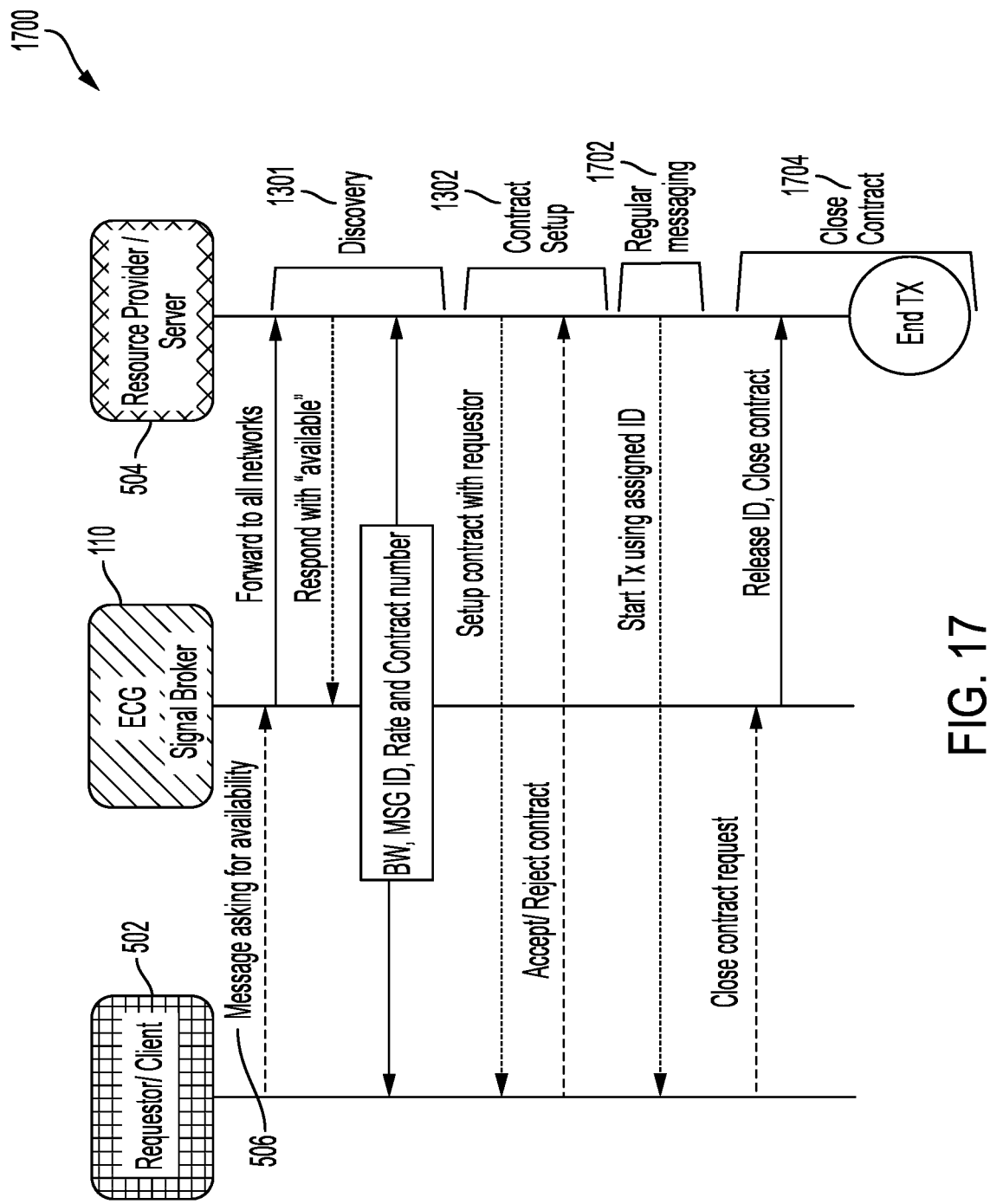
FIG. 17 illustrates an example complete data flow for the signal subscription model.

FIG. 17 illustrates an example complete data flow 1700 for the signal subscription model. As shown, the data flow 1700 includes the discovery 1301 and contract setup 1302 phases discussed above, as well as regular message transmission and contract termination. To initiate the signal subscription, the client 502 may send a signal availability request message 506 to the EGC 110 asking for availability of one or more signals 610. Responsive to receipt of the signal availability request message 506, the ECG 110 may forward the signal availability request message 506 to all CAN buses 106 connected to the ECG 110. The server 504 providing the one or more signals 610 may respond with a signal availability response message 702 indicating the availability. The ECG 110 may receive the signal availability response message 702 and may negotiate the CAN message ID, allowed rate, and contract number for the signal 610 between the client 502 and the server 504. Responsive to the negotiation, the server 504 may sent a contract message 1302 to set up the contract with the client 502. Responsive to receipt of the contract message 1302 from the server 504, the client 502 may send a contract message 1302 in response to accept or reject the contract. If accepted, the server 504 may begin to transmit the signal 610 over the CAN bus 106 using the assigned message ID. This is shown as regular messaging 1702. Responsive to the client 502 no longer requiring the signal 610, the client 502 may send a contract message 1302 to the ECG 110 requesting to close the transmission of the signal 610, as shown at 1704. Responsive to receipt of the close contract message 1302, the ECG 110 may send a close contract message 1302 to the server 504 including the contract ID and requesting the server 504 to discontinue sending the signal 610. This may accordingly cause the server 504 to discontinue the transmission of the signal 610.

In addition to the signal subscription model, the system 100 may also support a contract query model. The contract query model may be used to decode the dynamic CAN messages sent from a server 504 for debug or data logging purposes. This contract query model is discussed with respect to FIGS. 18-21.

Figure 18:
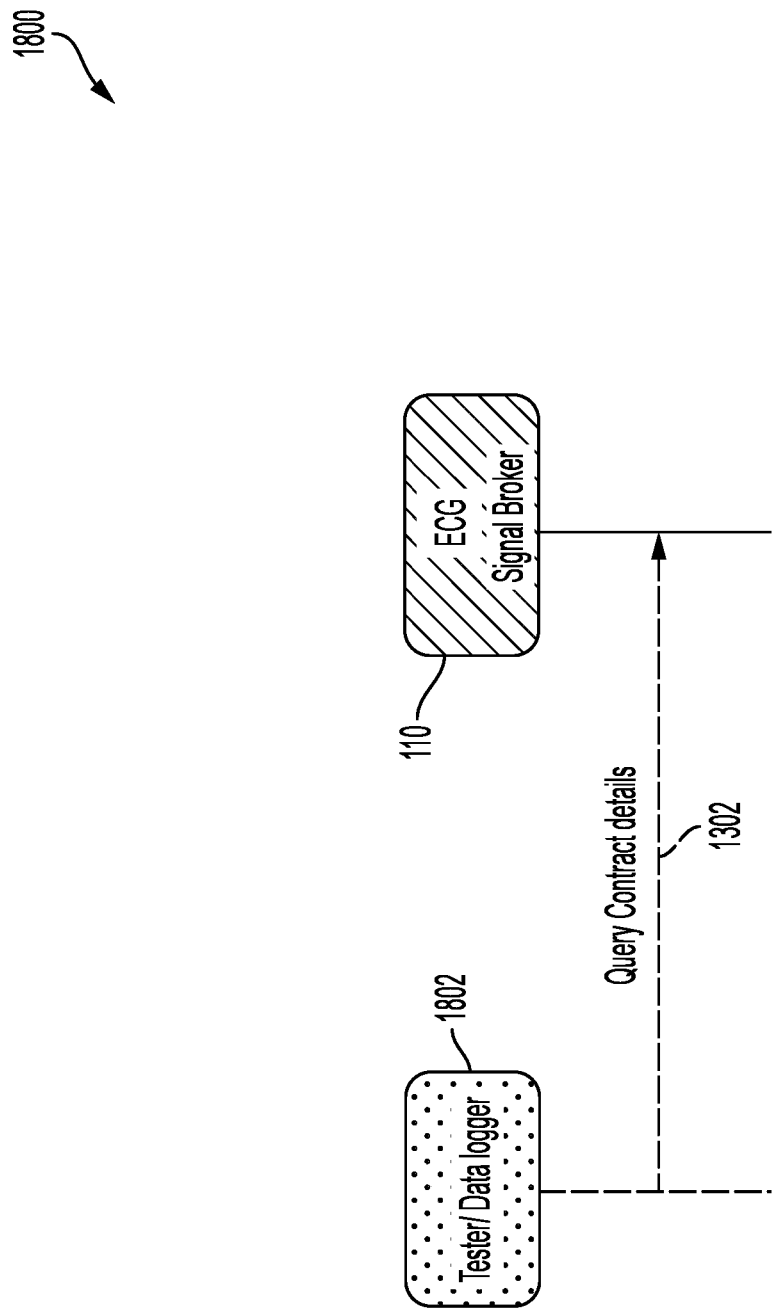
FIG. 18 illustrates an example query contract details data flow portion of the contract query model.

FIG. 18 illustrates an example query contract details data flow 1800 portion of the contract query model. As shown, communications may be between a tester or data logger device 1802, and the ECG 110. In an example, the tester or data logger device 1802 may be an OBD-II tester device connected to the diagnostic port 108 of the network. In another example, the tester or data logger device 1802 may be one of the ECUs 104 of the vehicle 102. The tester or data logger device 1802 may send a contract message 1302 to the ECG 110 with a contract type 1404 of query.

Figure 19:
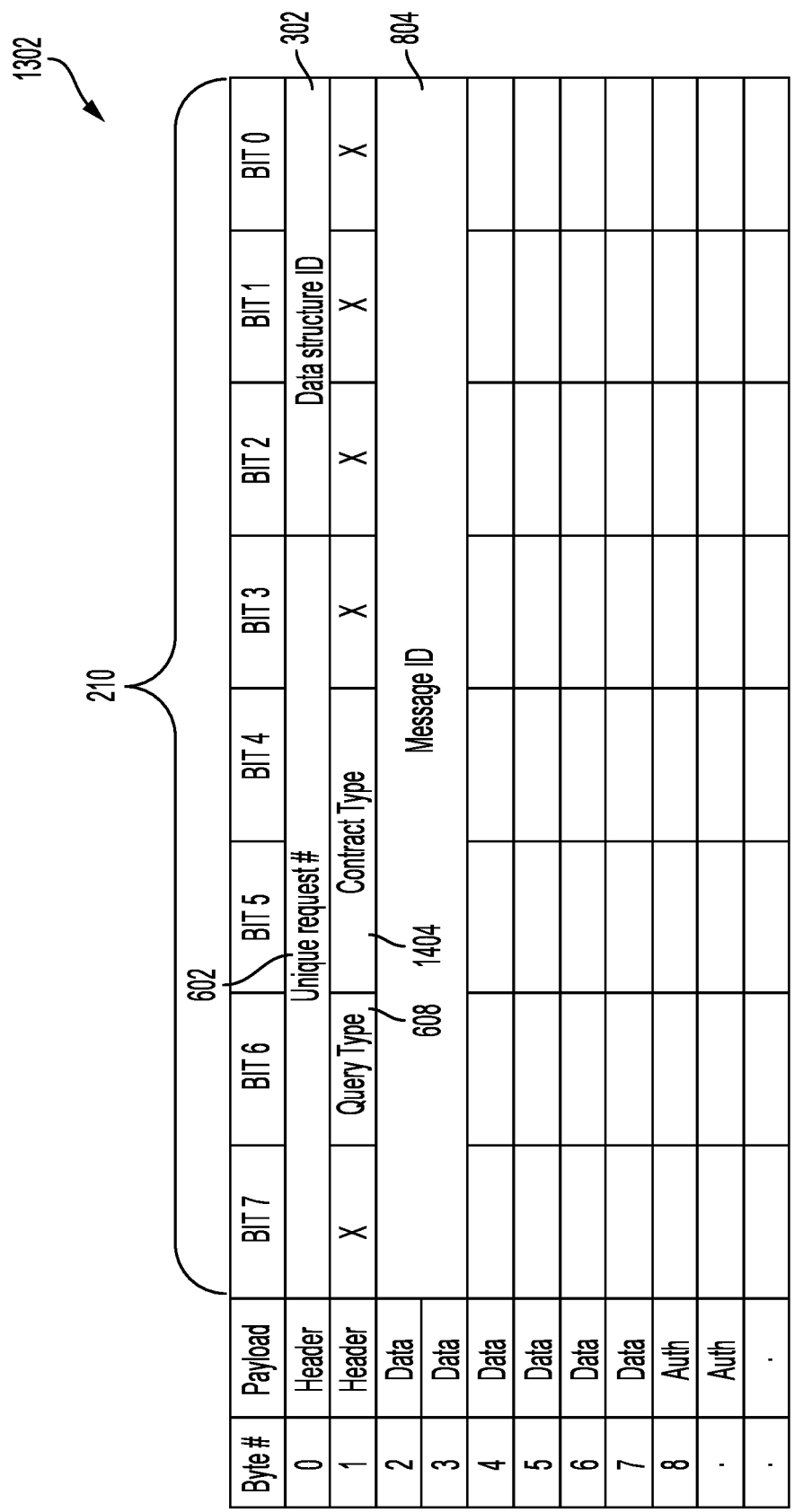
FIG. 19 illustrates an example of a query contract message.

FIG. 19 illustrates an example of a query contract message 1302. Similar to as discussed with respect to FIG. 14, a contract message 1302 is shown. In the example here, the contract type 1404 may be set to query, the query type 608 may be set to request, the unique request number 602 may be set to a unique value, and the data structure ID 302 may be set to contract.

Figure 20:
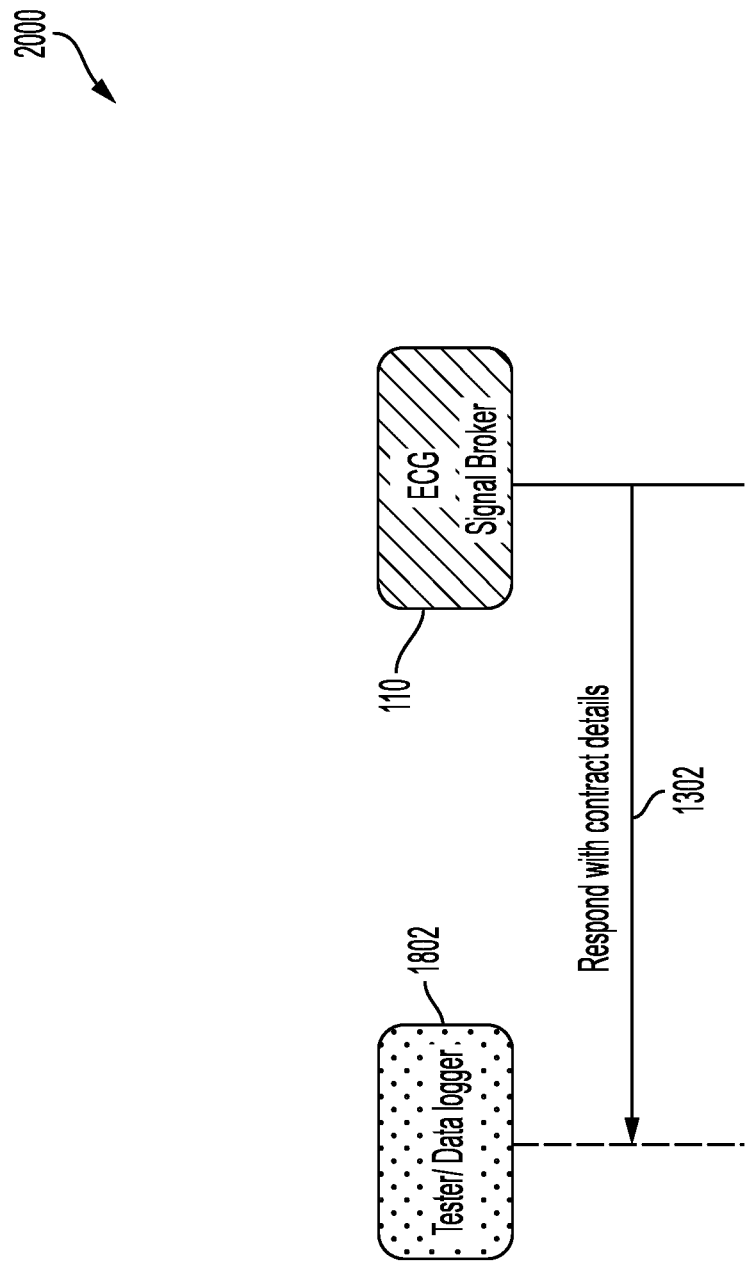
FIG. 20 illustrates an example query response contract details data flow portion of the contract query model.

FIG. 20 illustrates an example query response contract details data flow 2000 portion of the contract query model. As shown, responsive to the query contract message 1302 sent in FIG. 18, the EGC 110 may respond with a query response contract message 1302 including the contract details.

Figure 21:
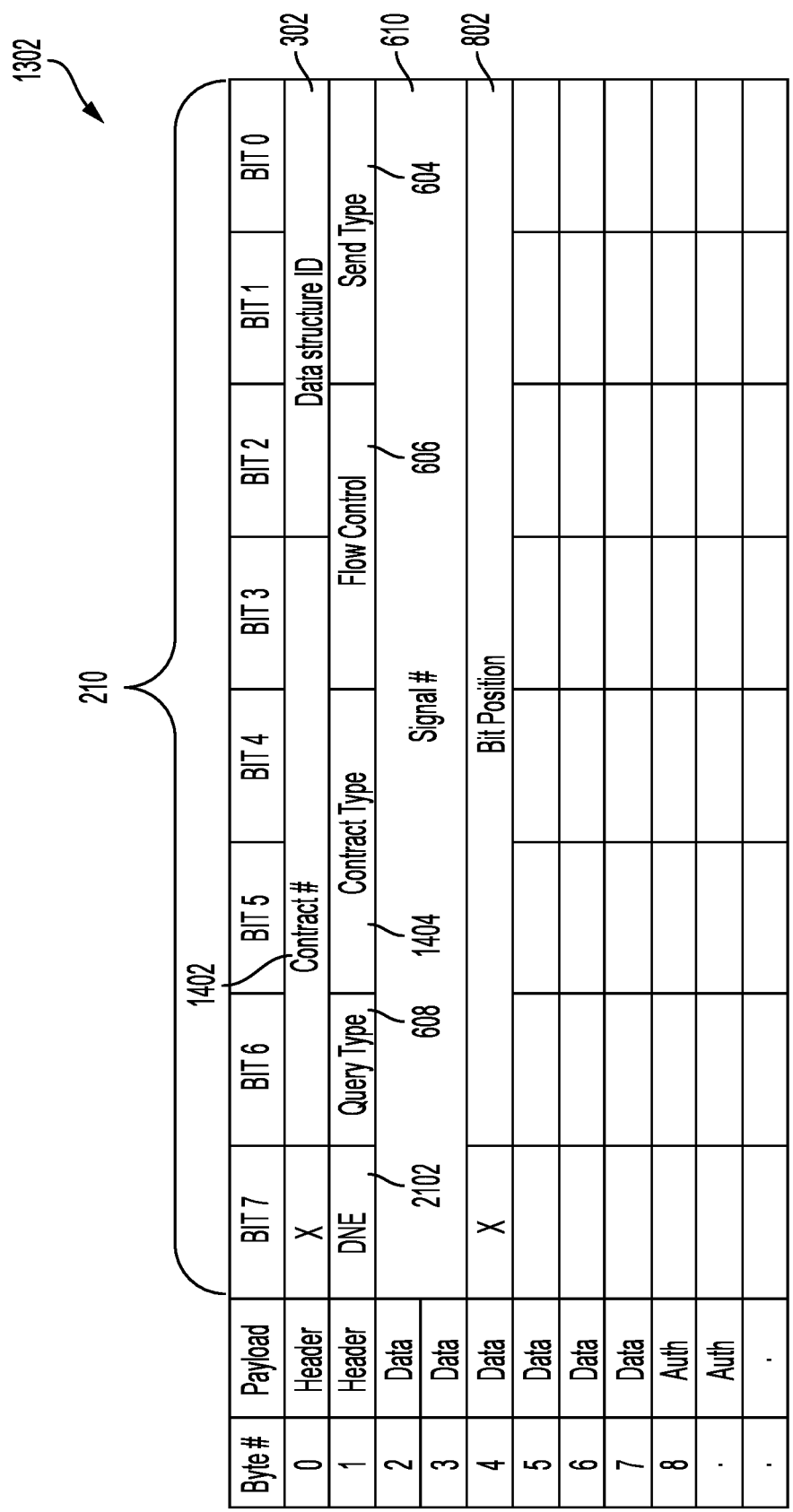
FIG. 21 illustrates an example of a query response contract message.

FIG. 21 illustrates an example of a query response contract message 1302. If the query response contract message 1302 indicates a valid response, the DNE 2102 bit may be set to false. If, however, the query response contract message 1302 indicates that the requested contract does not exist, then the DNE 2102 bit may be set to true. If true, the contract type and other information in the query response contract message 1302 may be disregarded.

Similar to as discussed with respect to FIG. 16, for a valid response, in the dynamic CAN header portion of the data fields 210, the message the data structure ID 302 may be set to contract, the contract number 1204 may be set to the number corresponding to the requested message ID 804, the send type 604 may be set to the send information specified for the contract, the flow control 606 may be set to the flow parameter set for the contract, the contract type 1404 may be set to query, and the query type 608 may be set to response. In the body portion of the data fields 210, the query response contract message 1302 may include the signal number 610 of the signal as well as the bit position 802 within the signal of the value, those values being as discussed above.

In addition to the signal subscription model and contract query model, the system 100 may also support an I/O control model. The I/O control model may be used for event-based tasks (e.g., to turn on headlamps remotely). This I/O control model is discussed with respect to FIGS. 22-25.

Figure 22:
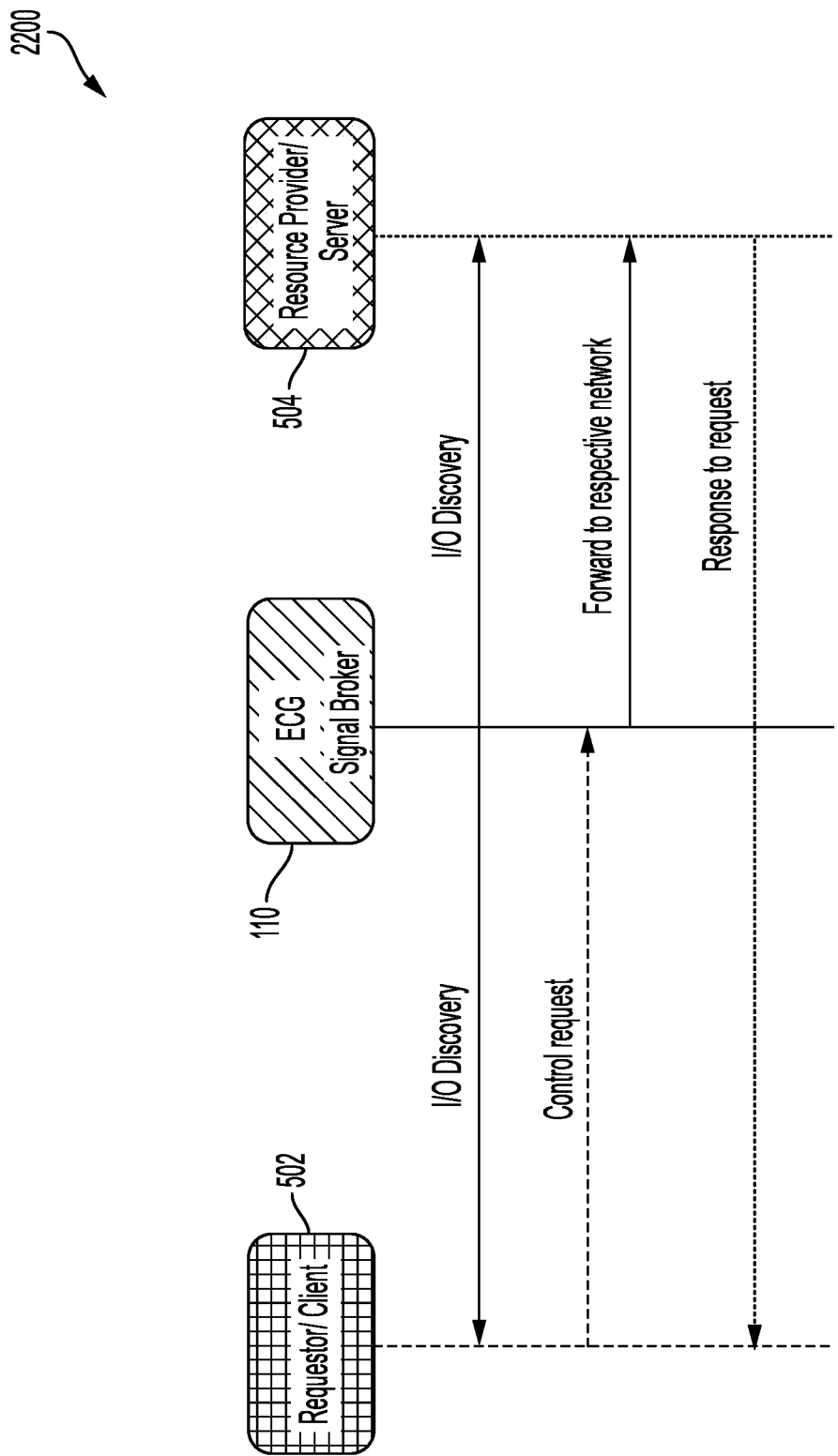
FIG. 22 illustrates an example I/O control model data flow.

FIG. 22 illustrates an example I/O control model data flow 2200. This model includes three phases, discovery, control request, and response to the request. The discovery phase may be initiated by the ECG 110. For example, the discovery phase may be initiated at end of line at a factory responsive to completion of the build of the vehicle 102. In another example, the discovery phase may be initiated at one or more interim times during vehicle 102 build. In yet another example, the discovery phase may be initiated at responsive a software update being installed to the vehicle (e.g., installed to an ECU 104 under the direction of the ECG 110).

In the discovery phrase, the ECG 110 may send an I/O discovery message to each of the ECUs 104. The ECUs 104 may reply to the ECG 110, which may maintain a list of all available I/O on the vehicle 102.

Figure 23:
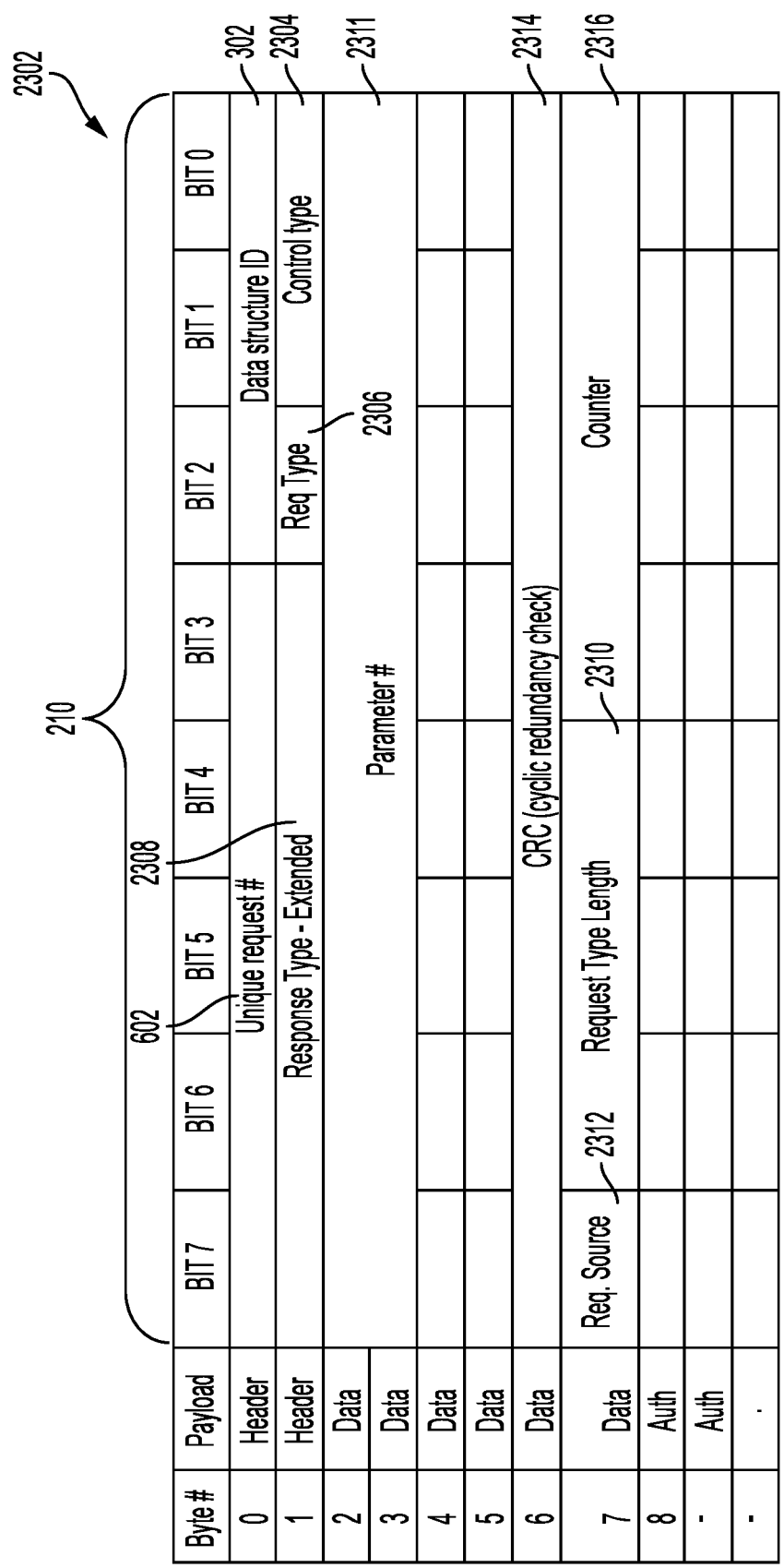
FIG. 23 illustrates an example of a I/O control request message.

FIG. 23 illustrates an example of a I/O control request message 2302. With continued reference to FIG. 22, in the control request phase, the client 502 may send an I/O control request 2302 message to the ECG 110. Responsive to receipt of the I/O control request message 2302, the vehicle EGC 110 may forward the I/O control request 2302 message to the CAN bus 106 to which the correct server 504 is connected.

Figure 24:
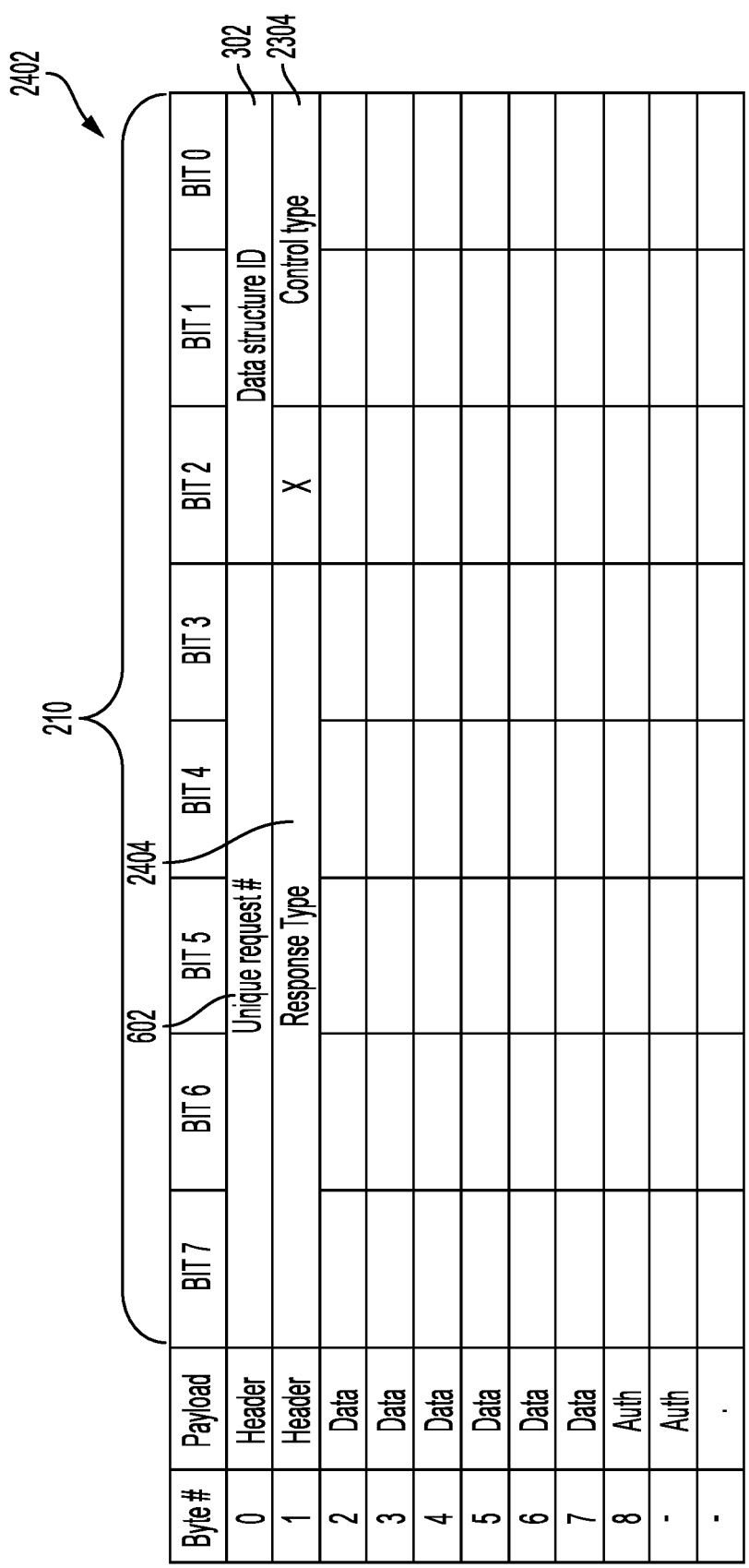
FIG. 24 illustrates an example of a negative I/O control response message.
Figure 25:
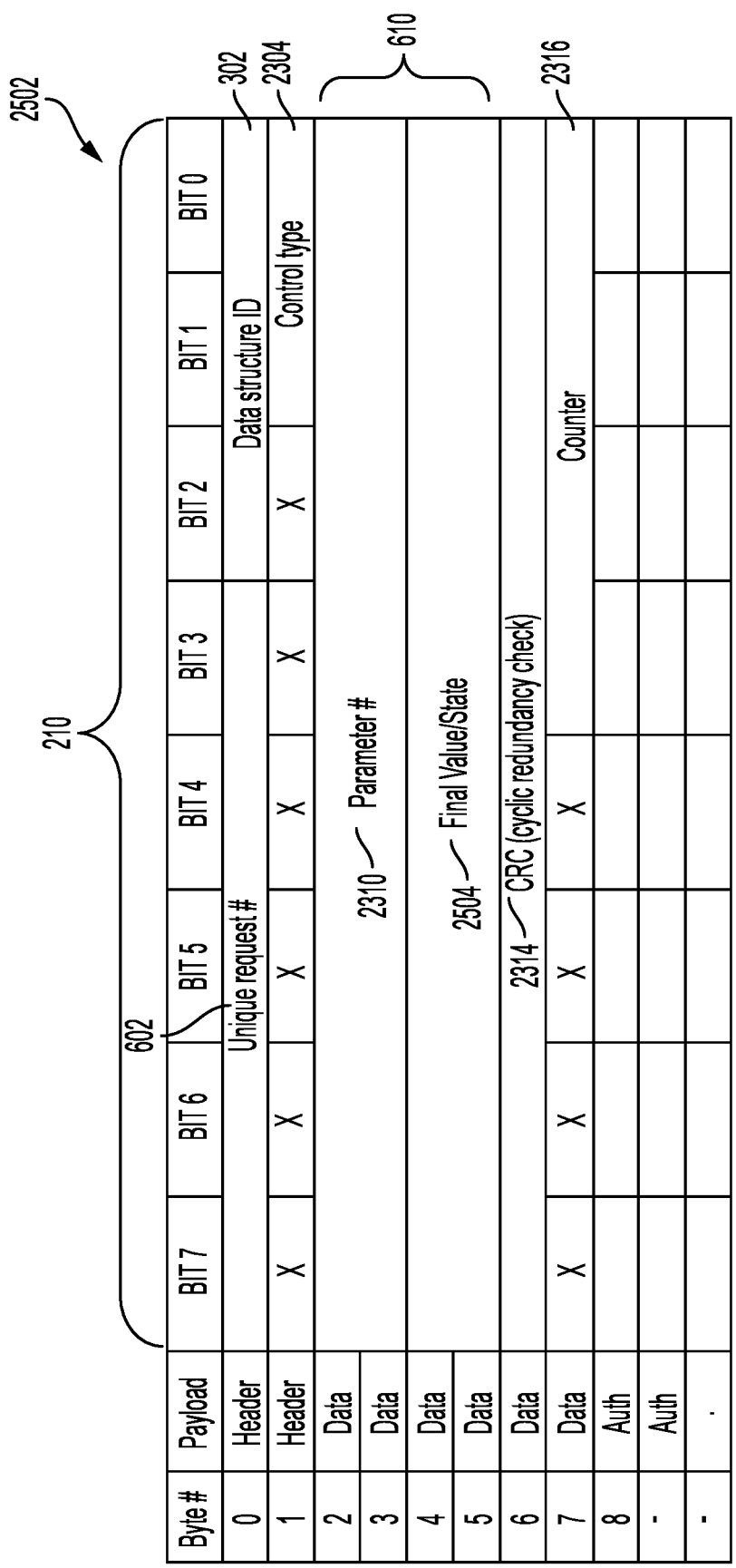
FIG. 25 illustrates an example of a positive I/O control response message.

FIG. 24 illustrates an example of a negative I/O control response message 2402. FIG. 25 illustrates an example of a positive I/O control response message 2502. With continued reference to FIG. 22, in the response to the request phase, the server 504 may return a negative I/O control response message 2402 or positive I/O control response message 2502 to the ECG 110, which may, in turn, be forwarded back to the client 502.

Referring more specifically to FIG. 23, an example I/O control request message 2302 is shown. The client 502 may send the I/O control request message 2302 to initiate an I/O request. As shown, the data structure ID 302 and unique request number 602 are as previously discussed.

Additionally, included in the header portion of the data field 210, a control type 2304 field may be used to specify a type of the I/O control request message 2302. These control types may include, for example, an I/O request type, a type to request a value, a type to indicate in a response that the request was positively completed, and a type to indicate a negative result.

The header portion of the data field 210 may also include a request type 2306. The request type may be a bit used to indicate between two values, such as whether to activate or deactivate the requested I/O feature. If a greater quantity of values are required for the I/O feature, then an extended request type 2308 may be further included in the header. For instance, the extended request type 2308 may include 5 bits to allow for 32 unique combinations for custom requests. In such a case, a request length 2310 may be specified in the payload portion of the data field 210 specifying how long the extended request type 2308 is in bits. In some examples, if the extended request type 2308 is non-zero, then the request type 2306 may be ignored and the extended request type 2308 may instead be used. In one specific example, the fourth and fifth bytes of the data field 210 may specify data such as position/angle values for a specific extended request type 2308.

The parameter number field 2311 may be a field in the payload of the data field 210 and may refer to a unique number assigned to controllable I/O being requested. In an example, the parameter numbers may be derived from existing signals, data identifiers (DIDs), or parameter identifiers (PIDs) of the ECUs 104. In another example, the parameter numbers may be custom assigned per module. An example DID/PID diagnostic mechanism is defined in SAE J1979 and allows an ECU 104 to set aside a predefined set of information at an address that can be called via a diagnostic method. DIDs may hold information that provides insight to system status and performance. The parameter number field 2311 may accordingly include existing DID and/or PID specifiers in some implementations.

A request source 2312 may also be included as a field in the payload of the data field 210. The request source 2312 may specify whether the I/O control request message 2302 originated on the vehicle 102 or was received from external to the vehicle 102 such as from a cloud server.

A cyclic redundancy check (CRC) 2314 field and a counter 2316 field may optionally also be included in the payload of the data field 210. The CRC and counter fields may be used to allow the recipient of the I/O control request message 2302 to ensure that the fields are correctly received without network errors and to provide end-to-end (E2E) protection for the transmission of the I/O control request message 2302.

As noted above, the I/O control request message 2302 may have a negative response type meaning that the I/O control request message 2302 request was unable to be completed, or a positive response type meaning that handling of the I/O control request message 2302 was completed successfully.

Referring more specifically to FIG. 24, as noted above an example negative I/O control response message 2402 is illustrated. As shown, the data structure ID 302 and unique request number 602 are as previously discussed. The control type 2304 noted above in the discussion of the I/O control request message 2302 may specify that this is a negative response.

Additionally, a response type 2404 field may indicate a code or reason why the response was negative. For instance, the response type 2404 may indicate that the request was invalid, that the I/O feature is disabled or not supported, that the I/O function failed, that the I/O function is busy or in use, that a fault occurred when attempting to perform the I/O function, that the request to use the I/O function was rejected, that the I/O function is pending, etc.

Referring more specifically to FIG. 25, an example positive I/O control response message 2502 is illustrated. As shown, the data structure ID 302 and unique request number 602 are as previously discussed. The control type 2304 noted above in the discussion of the I/O control request message 2302 may specify that this is a positive response. The payload of the data field 210 may also specify the parameter 2310 as noted for the noted for the I/O control request message 2302, as well as optionally specify a CRC 2314 and/or counter 2316 as noted for the I/O control request message 2302.

Additionally, the positive I/O control response message 2502 may specify a final value or state 2504 responsive to completion of processing of the I/O control request message 2302. For instance, if the I/O control request message 2302 was of the value request control type 2304, then the requested value may be included in the final value or state 2504. Or, if the I/O control request message 2302 was a request to perform I/O, the final value or state 2504 may indicate a new state or return value for the performance of the requested I/O.

Thus, a dynamic CAN messaging system 100 is disclosed. Using the system, a signal subscription model may be used to allow client 502 requesters to subscribe to resource provider servers 504. Additionally, the contract query model may be used to decode the dynamic CAN messages sent from a server 504 for debug or data logging purposes. Further, the I/O control model may be used for event-based tasks (e.g., to turn on headlamps remotely).

It should be noted that certain infrastructure requirements may be required of the vehicle 102 to implement the described system 100. For instance, it may be useful to reserve bandwidth on the vehicle buses 106, and this reservation may be included in calculations as the vehicle 102 architecture is created. It may also be useful to include the signal 610 identifier as a CAN attribute for use in message databases. With respect to the CAN message ID 804, a range of 29 Bit message IDs (e.g., 18CA0000-18CA0FFF h (4096) may be reserved for this purpose).

With respect to the capabilities of ECUs 104 that would participate in the dynamic messaging, those ECUs 104 may be required to reserve CAN slots (buffer), non-volatile memory, and additional processing power for new message transmission and processing of requests. With respect to the functionality of the ECG 110, the ECG 110 may, as discussed herein, mediate the disclosed processes by being the signal broker 118. Thus, the ECG 110 may be configured to measure current bus load, keep track of all contracts (e.g., stored as data 120 to the storage 116), as well as be configured to send messaging to reset all participating ECUs 104 via a diagnostic request in case of an issue.

Computing devices described herein, such as the ECUs 104 and ECG 110, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for dynamic controller area network (CAN) messaging, comprising:
   a central gateway of a vehicle, including a processor and a storage, connected to a plurality of vehicle buses, each of the vehicle buses connected to one or more electronic control units (ECUs), programmed to:
   receive a message from a client of the ECUs, the message requesting a dynamic CAN signal, the dynamic CAN signal being dynamically available or unavailable over the plurality of vehicles buses, forward the message over the plurality of vehicle buses to a server of the ECUs, receive a response from the server, the response specifying potential availability of the dynamic CAN signal to the client but that the dynamic CAN signal is not already available, forward the response to the client, perform contract negotiation between the client and the server to add dynamic CAN signal as a new CAN message over the vehicle buses, and send a message identifier assignment message to the client and to the server, the message identifier assignment message including one or more of a bandwidth requirement for the new CAN message, a message identifier for the new CAN message, a rate for sending the new CAN message, and a contract number corresponding to the new CAN message.

2. The system of claim 1, wherein the response indicates a CAN message identifier and a bit position within a CAN message having the CAN message identifier at which the dynamic CAN signal is already available.

3. The system of claim 1, wherein the central gateway is further programmed to:
analyze client bus bandwidth between the client and the central gateway,
analyze server bus bandwidth between the server and the central gateway, and
verify that the client bus bandwidth and the server bus bandwidth support addition of delivery of the dynamic CAN signal in a new CAN message.

4. The system of claim 1, wherein the central gateway is further programmed to:
receive a setup contract message from the server responsive to receipt of the message identifier assignment message from the server;
pass the setup contract message to the client;
receive an accept contract message from the client responsive to receipt of the setup contract message to the client; and
pass the accept contract message to the server to cause the server to begin sending the new CAN message.

5. The system of claim 4, wherein the central gateway is further programmed to:
receive a reject contract message from the client responsive to receipt of the setup contract message to the client; and
pass the reject contract message to the server to cause the server to refrain from sending the new CAN message.

6. The system of claim 1, wherein the central gateway is further programmed to:
receive a query contract details message from a tester or logger device; and
responsive to receipt of the query contract details message, send one or more of the bandwidth requirement for the new CAN message, the message identifier for the new CAN message, the rate for sending the new CAN message, and the contract number corresponding to the new CAN message to the tester or logger device.

7. The system of claim 1, wherein the central gateway is further programmed to:
send an I/O discovery message to each of the ECUs;
receive I/O discovery responses from the ECUs; and
maintain a storage of available I/O functions of the ECUs based on the I/O discovery responses.

8. The system of claim 7, wherein the central gateway is further programmed to:
receive a control request from one of the ECUs requesting performance of one of the available I/O functions;
forward the control request to the one of the ECUs indicated in the storage as performing the requested I/O function;
receive a control response from the one of the ECUs indicated in the storage as performing the requested I/O function; and
forward the control response to the requesting one of the ECUs, the control response indicating a result or a value responsive to the I/O function.

9. A method for dynamic controller area network (CAN) messaging, comprising:
receiving, to a central gateway of a vehicle, the central gateway including a processor and a storage, connected to a plurality of vehicle buses, each of the vehicle buses connected to one or more electronic control units (ECUs), a message from a client of the ECUs, the message requesting a dynamic CAN signal, the dynamic CAN signal being dynamically available or unavailable over the plurality of vehicles buses,
forwarding the message over the plurality of vehicle buses to a server of the ECUs,
receiving a response from the server, the response specifying potential availability of the dynamic CAN signal to the client but that the dynamic CAN signal is not already available, and
forwarding the response to the client,
performing contract negotiation between the client and the server to add dynamic CAN signal as a new CAN message over the vehicle buses, and
sending a message identifier assignment message to the client and to the server, the message identifier assignment message including one or more of a bandwidth requirement for the new CAN message, a message identifier for the new CAN message, a rate for sending the new CAN message, and a contract number corresponding to the new CAN message.

10. The method of claim 9, wherein the response indicates a CAN message identifier and a bit position within a CAN message having the CAN message identifier at which the dynamic CAN signal is already available.

11. The method of claim 9, further comprising:
analyzing client bus bandwidth between the client and the central gateway,
analyzing server bus bandwidth between the server and the central gateway, and
verifying that the client bus bandwidth and the server bus bandwidth support addition of delivery of the dynamic CAN signal in a new CAN message.

12. The method of claim 9, further comprising:
receiving a setup contract message from the server responsive to receipt of the message identifier assignment message from the server;
passing the setup contract message to the client;
receiving an accept contract message from the client responsive to receipt of the setup contract message to the client; and
passing the accept contract message to the server to cause the server to begin sending the new CAN message.

13. The method of claim 12, further comprising:
receiving a reject contract message from the client responsive to receipt of the setup contract message to the client; and passing the reject contract message to the server to cause the server to refrain from sending the new CAN message.

14. The method of claim 9, further comprising:

receiving a query contract details message from a tester or logger device; and responsive to receipt of the query contract details message, sending one or more of the bandwidth requirement for the new CAN message, the message identifier for the new CAN message, the rate for sending the new CAN message, and the contract number corresponding to the new CAN message to the tester or logger device.

15. The method of claim 9, further comprising:

sending an I/O discovery message to each of the ECUs;

receiving I/O discovery responses from the ECUs; and maintaining a storage of available I/O functions of the ECUs based on the I/O discovery responses.

16. The method of claim 15, further comprising:

receiving a control request from one of the ECUs requesting performance of one of the available I/O functions;

forwarding the control request to the one of the ECUs indicated in the storage as performing the requested I/O function;

receiving a control response from the one of the ECUs indicated in the storage as performing the requested I/O function; and forwarding the control response to the requesting one of the ECUs, the control response indicating a result or a value responsive to the I/O function.

* * * * *